United States Patent
Kim et al.

(10) Patent No.: US 9,706,340 B2
(45) Date of Patent: Jul. 11, 2017

(54) METHOD AND APPARATUS PERFORMING PROXIMITY SERVICE IN WIRELESS COMMUNICATION SYSTEM

(71) Applicant: LG ELECTRONICS, INC., Seoul (KR)

(72) Inventors: Laeyoung Kim, Anyang-si (KR);
Jaehyun Kim, Anyang-si (KR);
Taehyeon Kim, Anyang-si (KR);
Hyunsook Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 14/376,820

(22) PCT Filed: Feb. 13, 2013

(86) PCT No.: PCT/KR2013/001109
§ 371 (c)(1),
(2) Date: Aug. 5, 2014

(87) PCT Pub. No.: WO2013/122374
PCT Pub. Date: Aug. 22, 2013

(65) Prior Publication Data
US 2015/0043429 A1     Feb. 12, 2015

Related U.S. Application Data

(60) Provisional application No. 61/748,727, filed on Jan. 3, 2013, provisional application No. 61/599,896, filed on Feb. 16, 2012.

(51) Int. Cl.
*H04W 80/04*   (2009.01)
*H04W 80/10*   (2009.01)
(Continued)

(52) U.S. Cl.
CPC .......... *H04W 4/008* (2013.01); *H04L 67/141* (2013.01); *H04L 67/18* (2013.01); *H04L 69/24* (2013.01);
(Continued)

(58) Field of Classification Search
CPC ....... H04L 67/141; H04L 67/18; H04L 69/24; H04W 4/008; H04W 4/02; H04W 80/04;
(Continued)

(56) References Cited

U.S. PATENT DOCUMENTS

2007/0286100 A1* 12/2007 Saaranen ................ H04L 67/16
                                                                 370/260
2008/0192733 A1*  8/2008 Song .................... H04L 65/1016
                                                                 370/352

(Continued)

FOREIGN PATENT DOCUMENTS

JP         04763037 B2    6/2011
KR    10-2009-0053624 A   5/2009
KR    10-2011-0113630 A   10/2011

OTHER PUBLICATIONS

3GPP TS 23.228 V7.70, "3GPP: Technical Specification Group Services and System Aspects; IP Multimedia Subsystem (IMS); Stage 2 (Release 7)", Mar. 2007, See p. 36, lines 27-32; p. 53, line 14—p. 54, line 43; p. 104, lines 4-5; p. 105, lines 18-19; and figure 5.1.

*Primary Examiner* — Mang Yeung
*Assistant Examiner* — Natali N Pascual Peguero
(74) *Attorney, Agent, or Firm* — Dentons US LLP

(57) ABSTRACT

The present invention relates to a wireless communication system and, more particularly, to a method and apparatus for performing a proximity service in a wireless communication system. According to one embodiment of the present invention, a method for allowing a first Internet protocol multimedia subsystem (IMS) terminal to perform a proximity
(Continued)

service (ProSe) in a wireless communication system can comprise the steps of: allowing the first IMS terminal to transmit a first session initiation protocol (SIP) message containing ProSe communication request information to a second IMS terminal through a network node; and receiving a second SIP message containing ProSe communication response information from the second IMS terminal through the network node.

11 Claims, 13 Drawing Sheets

(51) Int. Cl.
*H04W 4/00* (2009.01)
*H04L 29/08* (2006.01)
*H04W 4/02* (2009.01)
*H04L 29/06* (2006.01)
*H04W 4/22* (2009.01)

(52) U.S. Cl.
CPC ............. *H04W 4/02* (2013.01); *H04W 80/04* (2013.01); *H04W 80/10* (2013.01); *H04W 4/023* (2013.01); *H04W 4/22* (2013.01)

(58) Field of Classification Search
CPC ..... H04W 80/10; H04W 4/005; H04W 4/023; H04W 4/22
USPC .................................................. 370/328, 352
See application file for complete search history.

(56) References Cited

U.S. PATENT DOCUMENTS

| | | | |
|---|---|---|---|
| 2010/0009675 A1 | 1/2010 | Wijting et al. | |
| 2010/0070632 A1* | 3/2010 | Song | H04W 76/026 709/227 |
| 2011/0196925 A1* | 8/2011 | Hans | G06Q 30/02 709/204 |

* cited by examiner

FIG. 3
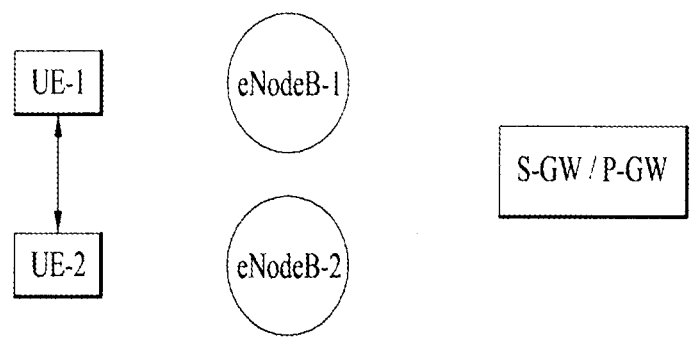
(a)
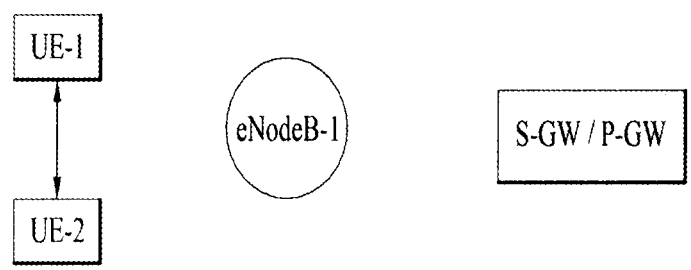
(b)

ical Field

METHOD AND APPARATUS PERFORMING PROXIMITY SERVICE IN WIRELESS COMMUNICATION SYSTEM

This application is a 35 USC §371 National Stage entry of International Application No. PCT/KR2013/001109, filed Feb. 13, 2013, and claims priority to U.S. Provisional Application Nos. 61/599,896 filed Feb. 16, 2012 and 61/748,727, filed Jan. 3, 2013, all of which are hereby incorporated by reference in its entirety.

TECHNICAL FIELD

The present invention relates to a wireless communication system and, more particularly, to a method and apparatus for performing proximity services (ProSe).

BACKGROUND ART

Proximity services (ProSe) refer to schemes for supporting communication between devices located physically close to each other. Specifically, ProSe is aimed to discover an application operating between devices which are in proximity and, ultimately, to support exchange of application-related data. For example, ProSe may be applied to applications such as social network services (SNS), commerce, and games.

ProSe may be also called device-to-device (D2D) communication. That is, ProSe refers to a communication scheme for establishing a direct link among a plurality of devices (e.g., user equipments (UEs)) and thus directly exchanging user data (e.g., voice, multimedia data, etc.) between the devices without going via a network. ProSe communication may include UE-to-UE communication, Peer-to-Peer communication, etc. Further, ProSe communication may be applied to Machine-to-Machine (M2M) communication, Machine Type Communication (MTC), etc. Accordingly, ProSe is considered as one solution for reducing the burden of a base station due to rapidly increasing data traffic. Besides, by adopting ProSe, effects such as reduction in procedures of a base station, reduction in power consumption of devices which participate in ProSe, increase in data transmission speed, increase in network capacity, load distribution, cell coverage expansion, etc. can be expected.

In addition, IP (Internet Protocol) Multimedia Subsystem (IMS) refers to an architectural framework for providing IP multimedia service in a variety of wired/wireless communication networks. The IMS uses a protocol applicable to various networks, e.g. Session Initiation Protocol (SIP). The SIP is a signaling protocol for controlling a multimedia service session using an IP, and can be used to set up, modify and terminate a unicast or multicast session. That is, the IMS helps users to easily access multimedia and voice data using a variety of wired/wireless devices.

A session(s) including one or more media flows (or media streams) may be configured using the IMS. The IMS session may be expressed in such a manner that a local side and a remote side are logically connected to each other via IMS network nodes. Here, a peered user equipment (UE) or server of a local-side UE may be called a remote end or a remote party. That is, a remote end is an entity for exchanging media flows with a local-side UE via an IMS network.

While adoption of ProSe is demanded as described above, a mechanism for supporting and controlling ProSe is not specifically prepared.

DISCLOSURE

Technical Problem

An object of the present invention devised to solve the problem lies to provide operation schemes of UEs and network nodes for communication through a direct data path between IMS UEs based on ProSe.

It is to be understood that both the foregoing general description and the following detailed description of the present invention are exemplary and explanatory and are intended to provide further explanation of the invention as claimed.

Technical Solution

The object of the present invention can be achieved by providing a method for performing Proximity Services (ProSe) by a first Internet protocol Multimedia Subsystem (IMS) User Equipment (UE) in a wireless communication system, the method including transmitting a first Session Initiation Protocol (SIP) message including ProSe communication request information to a second IMS UE via a network node, and receiving a second SIP message including ProSe communication response information from the second IMS UE via the network node.

In another aspect of the present invention, provided herein is a method for performing Proximity Services (ProSe) by a second Internet protocol Multimedia Subsystem (IMS) User Equipment (UE) in a wireless communication system, the method including receiving a first Session Initiation Protocol (SIP) message including ProSe communication request information from a first IMS UE via a network node, and transmitting a second SIP message including ProSe communication response information to the first IMS UE via the network node.

In another aspect of the present invention, provided herein is a first Internet protocol Multimedia Subsystem (IMS) User Equipment (UE) for performing Proximity Services (ProSe) in a wireless communication system, the first IMS UE including a transceiver module, and a processor, wherein the processor is configured to control the first IMS UE to transmit a first Session Initiation Protocol (SIP) message including ProSe communication request information to a second IMS UE via a network node, using the transceiver module, and to receive a second SIP message including ProSe communication response information from the second IMS UE via the network node, using the transceiver module.

In another aspect of the present invention, provided herein is a second Internet protocol Multimedia Subsystem (IMS) User Equipment (UE) for performing Proximity Services (ProSe) in a wireless communication system, the second IMS UE including a transceiver module, and a processor, wherein the processor is configured to control the second IMS UE to receive a first Session Initiation Protocol (SIP) message including ProSe communication request information from a first IMS UE via a network node, using the transceiver module, and to transmit a second SIP message including ProSe communication response information to the first IMS UE via the network node, using the transceiver module.

The followings may be commonly applied to the above methods and the UEs.

The first SIP message may further include ProSe capability information of the first IMS UE.

The second SIP message may further include ProSe capability information of the second IMS UE.

The ProSe capability information may include one or more information about one or more capabilities required to perform ProSe and information indicating whether the capabilities are enabled.

The ProSe capability information may be defined with one or more granularities among media or content type, bearer or connection type, application type, destination domain, communication peer identifier (ID), contact list and group information.

The first SIP message may be a session setup request message or a session update request message, and the second SIP message may be a session setup response message or a session update response message.

The first SIP message may be a session setup response message or a session update response message, and the second SIP message may be a response confirmation message.

The method may further include transmitting a third message including ProSe capability information of the first IMS UE to the network node.

The third message may be one of an SIP registration message, a presence service subscription request message and a presence service publication request message.

The method may further include receiving a fourth message including information indicating whether the network is capable of providing ProSe, from the network node.

The information indicating whether the network is capable of providing ProSe may be determined by the network node based on one or more of subscriber information of the first IMS UE or the second IMS UE, ProSe capability of the network node, operator policy, user preference, roaming status, network congestion status, and information about proximity between the first IMS UE and the second IMS UE.

The fourth message may be one of an SIP registration response message, a presence service subscription response message, a presence service publication response message and a presence service notification message.

The fourth message may include one or more of information for requesting or instructing to enable or disable ProSe capability of one or more of the first IMS UE and the second IMS UE, ProSe capability information of a target UE for the presence service, and information indicating whether Prose with the target UE for the presence service is possible.

The network node may include one or more of Call Session Control Function (CSCF), ProSe Application Server (AS) and Presence Service Server.

When a session related to one or more of the first SIP message and the second SIP message is terminated or canceled, ProSe result information may be transmitted from one of the first IMS UE and the second IMS UE to the network node.

The ProSe result information may include one or more of information indicating success or failure of setup of a direct data path, information about one or more of the amount of data and a time for communication through a direct data path, charging information, information about the types of media or contents communicated through a direct data path, information about the number of peered UEs with which communication is performed through direct data paths, information about directionality of a direct data path, information about an access type used for a direct data path, and information about the number and types of bearers used for a direct data path.

The network node may include one or more of Call Session Control Function (CSCF), ProSe Application Server (AS) and Presence Service Server.

The ProSe communication request information may be included in the first SIP message by one or more of the first IMS UE and the network node.

It is to be understood that both the foregoing general description and the following detailed description of the present invention are exemplary and explanatory and are intended to provide further explanation of the invention as claimed.

Advantageous Effects

According to the present invention, a method and apparatus for operation schemes of UEs and network nodes for communication through a direct data path between IMS UEs based on ProSe may be provided.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 3 is a view illustrating a direct mode data path between two UEs based on ProSe;

BEST MODE

Figure 1:
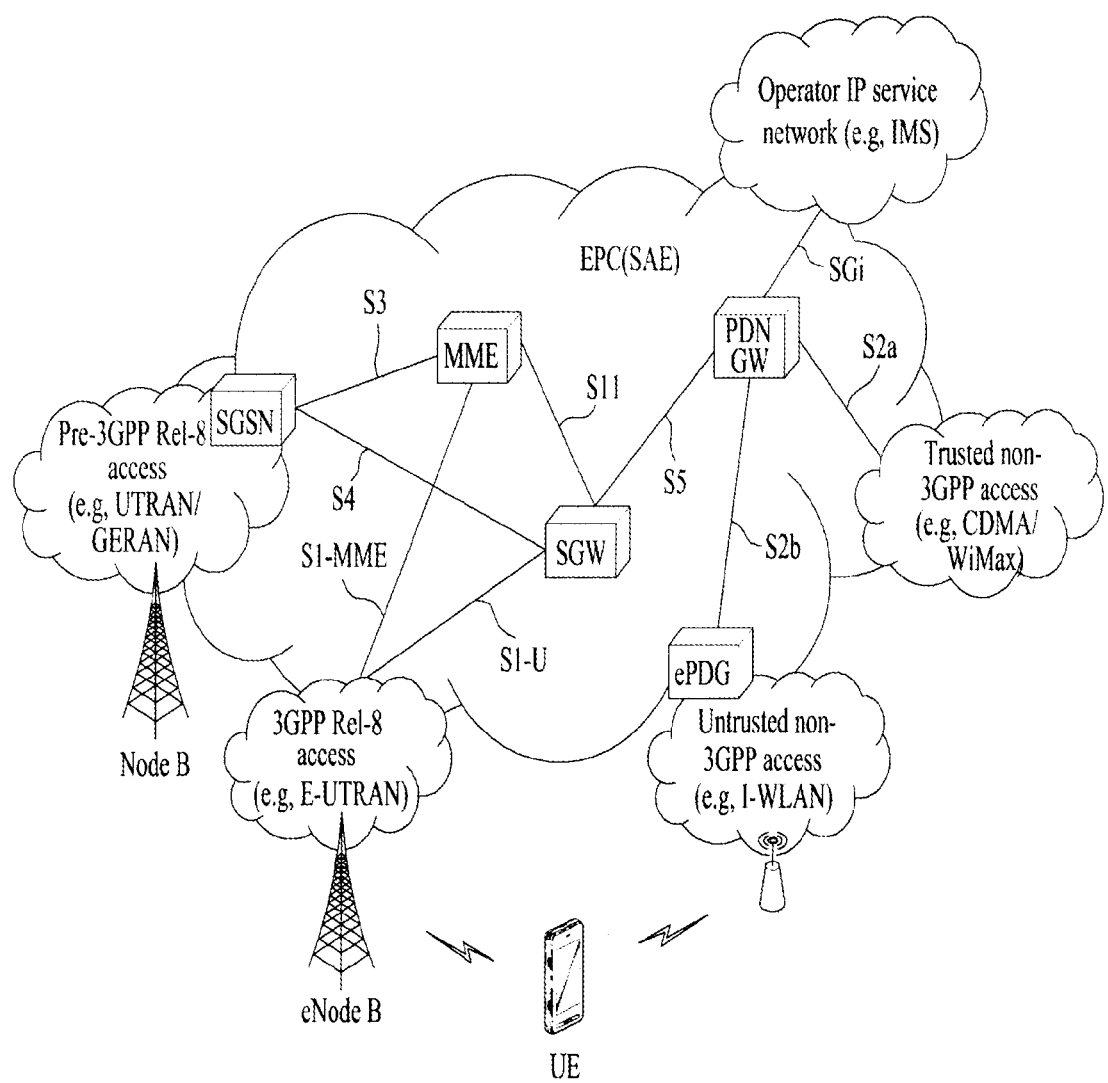
FIG. 1 is a view schematically illustrating the architecture of an Evolved Packet System (EPS) including an Evolved Packet Core (EPC)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. In addition, like reference numerals denote like elements in the drawings throughout the specification.

The embodiments of the present invention can be supported by technical standards disclosed for at least one of radio access systems such as Institute of Electrical and Electronics Engineers (IEEE) 802, 3rd Generation Partnership Project (3GPP), 3GPP Long Term Evolution (3GPP LTE), LTE-Advanced (LTE-A), and 3GPP2 systems. For steps or parts of which description is omitted to clarify the technical features of the present invention, reference may be made to these documents. Further, all terms as set forth herein can be explained by the technical standards.

The following technology can be used in various radio access systems. For clarity, the present disclosure focuses on 3GPP LTE and LTE-A systems. However, the technical features of the present invention are not limited thereto.

Terms used in the present specification are defined as follows.

UMTS (Universal Mobile Telecommunication System): A 3rd generation mobile communication technology based on Global System for Mobile communication (GSM), which is developed by 3GPP.

EPS (Evolved Packet System): A network system configured with an access network such as Evolved Packet Core (EPC), which is an Internet Protocol (IP)-based packet switched core network, LTE or UMTS Terrestrial Radio Access Network (UTRAN). EPS is a network evolved from UMTS.

NodeB: A base station of a GSM/EDGE (Enhanced Data rates for GSM Evolution) Radio Access Network (GERAN)/UTRAN, which is installed outdoor and has a coverage corresponding to a macro cell.

eNodeB (evolved Node B): A base station of an LTE network, which is installed outdoor and has a coverage corresponding to a macro cell.

UE (User Equipment): A user device. The UE may be referred to as a terminal, a mobile equipment (ME) or a mobile station (MS). In addition, the UE may be a portable device such as a laptop computer, a mobile phone, a personal digital assistant (PDA), a smartphone or a multimedia device, or a non-portable device such as a personal computer (PC) or a vehicle mounted device. The UE is capable of performing communication using a 3GPP spectrum such as LTE and/or a non-3GPP spectrum such as WiFi or public safety.

ProSe (Proximity Services or Proximity-based Services): Services enabling discovery and direct communication/ communication via a base station/communication via a third device between physically adjacent devices. In this case, user plane data is exchanged through a direct data path without going via a 3GPP core network (e.g., EPC).

Proximity: Proximity of a UE to another UE is determined based on whether a predetermined proximity condition is satisfied. Different proximity conditions can be given for ProSe discovery and ProSe communication. The proximity condition may be configured to be controlled by an operator.

ProSe Discovery: A process that identifies that a UE is in proximity of another, using Evolved Universal Terrestrial Radio Access (E-UTRA).

ProSe Communication: A communication between UEs in proximity by means of a data path established between the UEs. The data path can be established directly between the UEs or routed via a local base station(s) (e.g., eNodeB(s)).

ProSe-enabled UE: A UE supporting ProSe discovery and/or ProSe communication.

ProSe-enabled Network: A network supporting ProSe discovery and/or ProSe communication.

RAN (Radio Access Network): A unit including a NodeB, an eNodeB and a radio network controller (RNC) for controlling the NodeB and the eNodeB in a 3GPP network. The RAN is present between a UE and a core network and provides connection to the core network.

HLR (Home Location Register)/HSS (Home Subscriber Server): A database having subscriber information in a 3GPP network. HSS may perform functions such as configuration storage, identity management and user state storage.

RANAP (RAN Application Part): An interface between RAN and a node (e.g., Mobility Management Entity (MME)/Serving GPRS (General Packet Radio Service) Supporting Node (SGSN)/Mobile Switching Center (MSC)) for controlling a core network.

PLMN (Public Land Mobile Network): A network configured to provide mobile communication service to individuals. PLMN can be configured on an operator basis.

NAS (Non-Access Stratum): A functional layer for signaling and exchanging of traffic messages between a UE and a core network in a UMTS protocol stack. NAS supports mobility of the UE and supports a session management procedure for establishing and maintaining IP connection between a UE and a Packet Data Network GateWay (PDN GW).

HNB (Home NodeB): Customer Premises Equipment (CPE) for providing UTRAN coverage. For details thereof, reference can be made to 3GPP TS 25.467.

HeNodeB (Home eNodeB): CPE for providing Evolved-UTRAN (E-UTRAN) coverage. For details thereof, reference can be made to 3GPP TS 36.300.

CSG (Closed Subscriber Group): A group of subscribers who are permitted to access one or more CSG cells of a Public Land Mobile Network (PLMN) as members of a CSG of a H(e)NB.

LIPA (Local IP Access): An access for an IP capable UE connected via a H(e)NB to another IP capable entity in the same residential/enterprise IP network. LIPA traffic is expected to not traverse a mobile operator's network. A 3GPP Release-10 system provides an access via a H(e)NB to resources of a local network (e.g., network located at the customer's home or enterprise).

SIPTO (Selected IP Traffic Offload): In a 3GPP Release-10 system, an operator selects a Packet data network GateWay (PGW) which is physically close to a UE in an EPC network and supports handover of user traffic.

PDN (Packet Data Network) Connection: A logical connection between a UE indicated by a single IP address (e.g., single IPv4 address and/or single IPv6 prefix) and a PDN indicated by an Access Point Name (APN).

IMS (IP Multimedia Subsystem): A subsystem for providing multimedia services based on IPs.

IMS Registration: A procedure for reporting information related to a current location of a UE to a home IMS network by the UE.

AS (Application Server): A server for providing a variety of multimedia services.

SCC AS (Service Centralization and Continuity Application Server): An application server for supporting continuity of multimedia sessions.

CSCF (Call Session Control Function): A server or proxy server for processing SIP signaling packets in IMS. The CSCF can be categorized into Proxy-CSCF (P-CSCF), Serving-CSCF (S-CSCF) and Interrogating-CSCF (I-CSCF).

EPC (Evolved Packet Core)

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a conventional gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN or Wi-Fi hotspot).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access |

TABLE 1-continued

| Reference Point | Description |
| --- | --- |
| | network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Control Mechanism for Providing Proximity Services (ProSe)

The present invention proposes a control mechanism for supporting proximity services (ProSe) or D2D services in a mobile communication system such as 3GPP Evolved Packet System (EPS).

Due to increase in user demands related to social network service (SNS), etc., demands for detection/discovery between physically adjacent users/devices and special applications/services (e.g., proximity-based applications/services) have appeared. Even in a 3GPP mobile communication system, potential use cases and scenarios of ProSe and potential service requirements to provide such service are under discussion.

The potential use cases of ProSe may include commercial/social service, network offloading, public safety, integration of current infrastructure services (to assure the consistency of the user experience including reachability and mobility aspects). In addition, use cases and potential requirements for public safety in the case of absence of EUTRAN coverage (subject to regional regulations and operator policies, and limited to specific public-safety designated frequency bands and terminals) are under discussion.

In particular, the scope of discussion of ProSe by 3GPP assumes that proximity-based applications/services are provided via LTE or WLAN, and that discovery and communication are performed between devices under the control of an operator/network.

Figure 2:
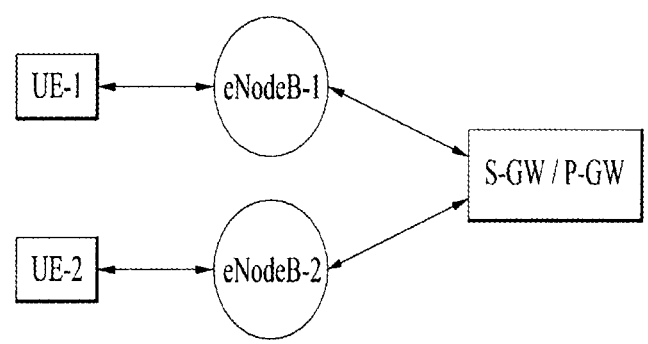
FIG. 2 is a view illustrating a default data path for communication between two UEs in an EPS.

FIG. 2 is a view illustrating a default data path for communication between two UEs in an EPS. That is, FIG. 2 illustrates an exemplary data path between UE-1 and UE-2 in a general case of no ProSe between UE-1 and UE-2. This default path goes via a base station (e.g., eNodeB or Home eNodeB) and gateway nodes (e.g., EPC or operator network). For example, as illustrated in FIG. 2, when UE-1 and UE-2 exchange data, data from UE-1 may be transmitted via eNodeB-1, S-GW/P-GW, and eNodeB-2 to UE-2 and, likewise, data from UE-2 may be transmitted via eNodeB-2, S-GW/P-GW, and eNodeB-1 to UE-1. Although UE-1 and UE-2 are camped on different eNodeBs in FIG. 2, UE-1 and UE-2 may be camped on the same eNodeB. In addition, although the two UEs are served by the same S-GW and P-GW in FIG. 2, various combinations of services are allowed here. For example, the UEs may be served by the same S-GW and different P-GWs, by different S-GWs and the same P-GW, or by different S-GWs and different P-GWs.

In the present invention, this default data path may be referred to as an infrastructure path, infrastructure data path or infrastructure communication path. In addition, communication through the infrastructure data path may be referred to as infrastructure communication.

FIG. 3 is a view illustrating a direct mode data path between two UEs based on ProSe. This direct mode data path does not go via a base station (e.g., eNodeB or Home eNodeB) and gateway nodes (e.g., EPC).

FIG. 3(a) illustrates an exemplary case in which UE-1 and UE-2 are camped on different eNodeBs (e.g., eNodeB-1 and eNodeB-2) and exchange data through a direct mode data path. FIG. 3(b) illustrates an exemplary case in which UE-1 and UE-2 are camped on the same eNodeB (e.g., eNodeB-1) and exchange data through a direct mode data path.

It should be noted that a data path of a user plane is directly established between UEs without going via a base station or a gateway node as illustrated in FIG. 3, but a control plane path can be established via a base station and a core network. Control information exchanged through the control plane path may be information about session management, authentication, authorization, security, charging, etc. In the case of ProSe communication between UEs served by different eNodeBs as illustrated in FIG. 3(a), control information for UE-1 may be exchanged via eNodeB-1 with a control node (e.g., MME) of a core network, and control information for UE-2 may be exchanged via eNodeB-2 with a control node (e.g., MME) of a core network. In the case of ProSe communication between UEs served by the same eNodeB as illustrated in FIG. 3(b), control information for UE-1 and UE-2 may be exchanged via eNodeB-1 with a control node (e.g., MME) of a core network.

Figure 4:
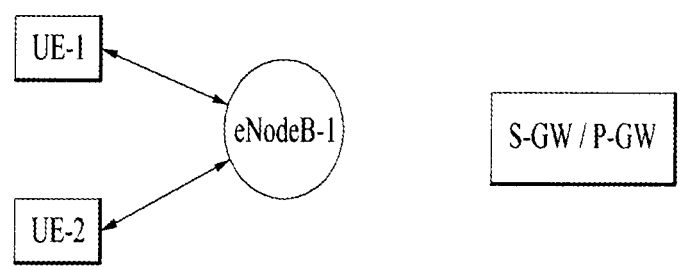
FIG. 4 is a view illustrating a locally-routed data path between two UEs based on ProSe.

FIG. 4 is a view illustrating a locally-routed data path between two UEs based on ProSe. As illustrated in FIG. 4, a ProSe communication data path between UE-1 and UE-2 is established via eNodeB-1 but does not go via a gateway node (e.g., EPC) operated by an operator. For a control plane path, if a locally-routed data path is established between UEs served by the same eNodeB as illustrated in FIG. 4, control information for UE-1 and UE-2 may be exchanged via eNodeB-1 with a control node (e.g., MME) of a core network.

In the present invention, the data path described above in relation to FIGS. 3 and 4 may be referred to as a direct data path, data path for ProSe, ProSe-based data path or ProSe communication path. In addition, communication through this direct data path may be referred to as direct communication, ProSe communication or ProSe-based communication.

IMS (IP Multimedia Subsystem)

Figure 5:
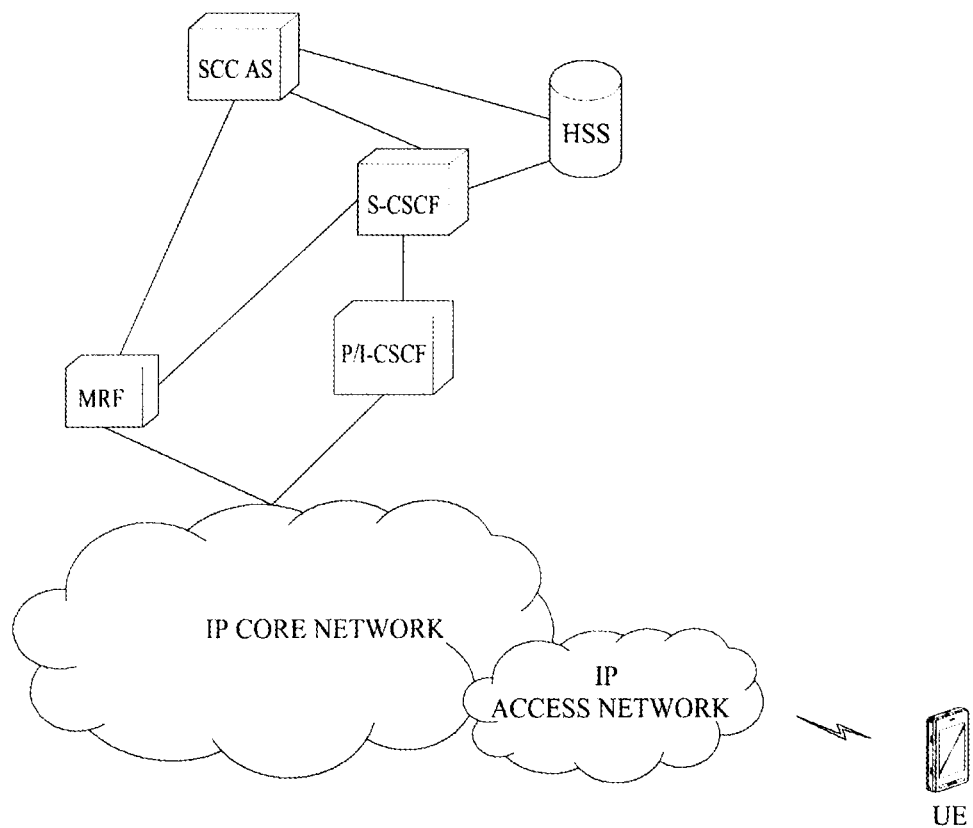
FIG. 5 is a view schematically illustrating the architecture of an IMS-based wireless communication system.

FIG. 5 is a view schematically illustrating the architecture of an IMS-based wireless communication system.

The MS-based wireless communication system may include various elements and FIG. 5 illustrates some of the elements, e.g., UE, access and core networks, Multimedia Resource Function (MRF), P/I-CSCF, S-CSCF, AS and Home Subscriber Server (HSS).

The UE may communicate with IMS related nodes and/or other UEs through an IP-based wireless access network such as E-UTRAN and a core network. The UE having IP capability may have a unique identifier (ID) (e.g., IMPU ID such as SIP URI or Tel URI) and an IP address.

The MRF corresponds to a server for proving media related functions such as media control (e.g., voice stream mixing), and includes MRFC and MRFP. The MRFC functions to analyze information received from the AS and S-CSCF and control the MRFP. The MRFP functions to mix, provide or process a media stream.

The P-CSCF is an SIP proxy server served as a contact point for an IMS UE. The P-CSCF may function to secure messages between the network and the UE and allocate resources for media flows.

The I-CSCF is an SIP server served as a contact point from a peered network. The I-CSCF may function to put a query to the HSS to determine S-CSCF for the UE.

The S-CSCF is a server for handling SIP registration, determining the location of each UE, and performing UE authentication and call processing (e.g., call routing). For example, when the UE desires to be registered in an IMS network, a UE registration message including information such as UE-supported media types, codec related information and screen size may be transmitted via the P-CSCF to the S-CSCF. Operation of the S-CSCF may be controlled according to the policy stored in the HSS.

The SCC AS is a home-network-based IMS application server for providing functions required for IMS centralized services and providing service continuity of multimedia sessions.

The HSS may perform functions such as configuration storage, identity management and user state storage.

IMS-Based ProSe

The present invention proposes a mechanism for providing ProSe to an IMS UE. The IMS-based ProSe providing mechanism proposed by the present invention may also be applied to a ProSe-enabled UE having no IMS function. In this case, the principle of an IMS control message (e.g., SIP message) proposed by the present invention may be equally applied to another type control message (e.g., control message defined for ProSe, or HTTP message). In addition, the scope of the present invention is not limited to examples of IMS nodes and IMS servers which participate in the IMS-based ProSe providing mechanism proposed by the present invention, and operation proposed by the present invention may be performed by network nodes and network servers for providing similar functions.

As described above, only potential use cases and requirements of ProSe, basic data paths and control paths are under discussion, and details for the architecture and operation of a 3GPP network for supporting ProSe are not prepared.

Unlike a conventional data path (e.g., infrastructure data path) which goes via EPC, UEs communicate with each other through a direct data path without going via EPC in ProSe-based communication. When a certain UE desires to communicate with a peered UE through a direct data path, a mechanism for reporting this to a network (e.g., MME) is necessary. That is, even when user data is transmitted and received through a direct data path between UEs without going via a network, control/management of this ProSe communication (e.g., resource allocation, policy application and charging) may be preferably performed at a network side.

A conventional NAS message may be modified and used or a newly defined NAS message may be used to report that a UE desires communication through a direct data path to a network. Particularly, for a conventional system not considering ProSe, it is defined to transmit a service request (or extended service request) message to the MME for communication of a UE which was in an idle mode. Accordingly, the service request message may be modified and used when the UE reports ProSe information to the MME. However, when the UE is in a connected mode, the UE should transmit an NAS message such as a service request message to report ProSe information to the MME even when the NAS message does not need to be transmitted. That is, overhead may be increased by transmitting an unnecessary message in a conventional operation.

To solve this problem, the present invention proposes a scheme for transmitting and receiving ProSe information while minimizing additional message transmission of a UE. Particularly, the present invention proposes a scheme for efficiently providing ProSe to an IMS UE which performs session setup using a control message (e.g., SIP message) to transmit and receive user data to and from a peered UE.

A description is now given of specific schemes for including information indicating that a certain UE desires to communicate with a peered UE through a direct data path, additional information related to direct communication, etc. in an IMS control message according to the present invention. Scheme 1 to Scheme 5 described below may be applied independently or in combination.

Scheme 1

Scheme 1 relates to an operation for including information about ProSe capability in a message to perform IMS registration by an IMS UE.

Information about ProSe capability of a UE includes information about one or more capabilities of the UE (or user or subscriber) required to perform ProSe and/or information about enabled/disabled state of one or more capabilities required to perform ProSe. Hereinafter, this information is referred to as "ProSe capability information" of the UE.

Specifically, the UE may transmit information about whether the UE has capability for supporting a ProSe operation (e.g., discovery of a proximity UE by a certain UE, or direct communication between UEs) to a network to perform this ProSe operation. Here, the capability for supporting a ProSe operation may be expressed as a single capability or a set of a plurality of capabilities. In addition, even when the UE has capability itself for supporting a ProSe operation, if the capability can be enabled or disabled, the UE may transmit information about enabled/disabled state of the capability to the network.

When the IMS UE performs IMS registration, the IMS UE may transmit an SIP REGISTER request message to an IMS network by including ProSe capability information. For example, the ProSe capability information may be included in an SIP message using one or more of a header field of the SIP message, a body parameter of the header field, a tag field of the header field, a Session Description Protocol (SDP) field and an Extensible Markup Language (XML) body field. Here, the parameters of the SIP message may use (or reuse) conventionally defined parameters or may be defined as new parameters. For example, the ProSe capability information may be included in a contact header field of the SIP message in the form of one of media feature tags (e.g., in the name of "g.3gpp.proximity").

When the IMS UE discovers a proximity device or desires to perform direct communication with another IMS UE, the IMS UE may transmit the ProSe capability information to the IMS network during IMS registration. The ProSe capability information transmitted by the IMS UE may be stored in S-CSCF for serving the IMS UE. Additionally, the ProSe capability information may also be stored in HSS through interaction between the S-CSCF and the HSS.

The S-CSCF which has received the registration request message from the IMS UE may perform third party registration to an Application Server (AS) for providing ProSe, based on subscriber information and/or the ProSe capability information of the IMS UE. As such, the AS for providing ProSe (hereinafter referred to as ProSe AS) may store the ProSe capability information of the IMS UE. The ProSe AS may provide ProSe to the IMS UE upon a request of the IMS UE or due to determination of the network by anchoring a session originated or terminated by the IMS UE. The ProSe AS may be co-located with a conventional AS (e.g., SCC AS) or may be an additional AS.

Additionally, the ProSe capability information may be configured with various granularities.

The ProSe capability information may be defined and applied with various granularities. The granularities of the ProSe capability information may include media/content type, bearer/connection type, application type, destination domain, communication peer, etc. In addition, the UE may be determined whether to use subdivided ProSe for each granularity, or determined whether to use ProSe for a combination of two or more of the granularities. The above various granularities for the ProSe capability information are merely exemplary, and the scope of the present invention is not limited thereto. A detailed description is now given of the examples of the granularities.

The ProSe capability information may be configured per media type or content type (e.g., voice, video, image or text). The UE may maintain the ProSe capability information only with respect to media or contents for use of ProSe. Here, use of ProSe may mean that the UE currently uses, desires to use, capable of using, or considers to use ProSe, or a combination thereof. For example, if ProSe is not considered for voice but is considered for video, the ProSe capability information may be maintained with respect to video but may not be maintained with respect to voice. Although the media/content type is described above as an example, the technical idea that the ProSe capability information is maintained only with respect to a target for use of ProSe per granularity may be equally applied to other examples including the following examples.

The ProSe capability information may be configured per bearer or connection type (e.g., CS bearer, PS bearer, emergency bearer, LIPA or SIPTO connection). The UE may maintain the ProSe capability information only with respect to a bearer or connection for use of ProSe. For example, if ProSe is not considered for a Guaranteed Bit Rate (GBR) bearer but is considered for a non-GBR bearer, the ProSe capability information may be maintained with respect to the non-GBR bearer but may not be maintained with respect to the GBR bearer. As another example, if ProSe is considered only for an emergency bearer, the ProSe capability information may be maintained only with respect to the emergency bearer. As another example, if ProSe is considered only for an SIPTO connection, the ProSe capability information may be maintained only with respect to the SIPTO connection.

The ProSe capability information may be configured per application type. The UE may maintain the ProSe capability information only with respect to an application for use of ProSe. For example, if ProSe is not considered for application#1 but is considered for application#2, the ProSe capability information may be maintained with respect to application#2 but may not be maintained with respect to application#1.

The ProSe capability information may be configured per destination domain. The UE may maintain the ProSe capability information only with respect to a destination domain for use of ProSe. For example, if ProSe is not considered for domain a but is considered for domain b, the ProSe capability information may be maintained with respect to domain b but may not be maintained with respect to domain a.

The ProSe capability information may be configured per ID of a communication peer, specific contact list or specific group. The UE may maintain the ProSe capability information only with respect to a communication peer (or a list/group) for use of ProSe. For example, if ProSe is considered only for communication peers included in a specific list/group, the ProSe capability information may be maintained with respect to the communication peers included in the specific list/group but may not be maintained with respect to communication peers not included in the specific list/group.

When the ProSe capability information is configured with various granularities as described above, instead of simply not maintaining the ProSe capability information with respect to a granularity for which ProSe is not considered, ProSe capability of the UE may be configured as being "disabled". For example, when the ProSe capability information is configured with a granularity of application, the ProSe capability information may be managed for all applications and the ProSe capability of the UE may be configured as being enabled or disabled with respect to an application for use of ProSe. Here, the enabled or disabled state may be set by a user selection or a network indication. Meanwhile, the ProSe capability of the UE may be configured as being disabled with respect to applications not for use of ProSe.

Here, each UE may have single ProSe capability information and information indicating enabled/disabled state of ProSe capability may be subdivided according to the various granularities (i.e., whether the UE has ProSe capability itself may be configured irrespective of the granularities, and enabled/disabled state of the ProSe capability may be indicated per subdivided granularity). Otherwise, both the ProSe capability information and the ProSe capability enabled/disabled state indication information may be subdivided according to the various granularities (i.e., the ProSe capability information and the ProSe capability enabled/disabled state indication information are mapped 1 to 1). Alternatively, the ProSe capability information may be subdivided according to the various granularities and the ProSe capability enabled/disabled state indication information may be configured as a single piece for each UE (i.e., a plurality of subdivided ProSe capabilities may be simultaneously enabled or disabled).

The ProSe capability information may further include multi-hop communication information. The multi-hop communication information may include information indicating whether the UE is capable of performing direct communication with other UEs in a multi-hop manner, and information indicating enabled/disabled state thereof. In addition, the multi-hop communication information may be subdivided into one or more of information indicating whether the UE is capable of participating in multi-hop communication, information indicating whether the UE is capable of serving as an end node on a multi-hop path, and information indicating whether the UE is capable of serving as a relay node on a multi-hop path.

The ProSe capability information may further include 1-to-N communication information. The 1-to-N communication information may include information indicating whether the UE is capable of performing direct communication with other UEs in a 1-to-N manner, and information indicating enabled/disabled state thereof. In addition, the 1-to-N communication information may be subdivided into one or more of information indicating whether the UE is capable of participating in 1-to-N communication, information indicating whether the UE is capable of serving as "1" (e.g., master, broadcaster, leader or initiator) in 1-to-N communication, and information indicating whether the UE is capable of serving as "N" (e.g., one of N UEs) in 1-to-N communication.

In addition, the IMS registration operation may include an operation for reporting a result of determining whether ProSe is supportable, to the IMS UE by the S-CSCF and/or the ProSe AS. This reporting operation may be performed using a response message to the SIP REGISTER request message transmitted by the IMS UE for IMS registration, or using an additional message.

The S-CSCF and/or the ProSe AS should check predetermined reference information to determine whether ProSe is supportable for the UE. The predetermined reference information may include one or more of subscriber information of the UE, ProSe capability of the network, operator policy, user preference, roaming status and network congestion status.

Specifically, the subscriber information of the UE generally refers to information stored in the HSS, and may also correspond to information pre-configured in MME/SGSN, S-CSCF or ProSe AS. The S-CSCF and/or the ProSe AS may analyze/evaluate/determine whether the UE is capable of receiving ProSe, based on a rate system subscribed by a UE or permission of a subscribed service, which is included in this subscriber information. In this network determination operation, information about ProSe capability of the network (e.g., information about whether the network is capable of proving ProSe) may be considered in addition to the ProSe capability information.

In addition, the operator policy may be reflected to the subscriber information. That is, the subscriber information may include information processed and evaluated according to the intention of the operator as well as direct information about service subscription. Further, in the case of a roamed UE, information configured according to the policy of the operator (e.g., home operator or local operator) for ProSe usability of the UE may be included in the subscriber information in the form of explicit or implicit information.

Besides, the operator policy may be stored/updated separately from the subscriber information. Information about the operator policy may be stored in HSS, MME/SGSN, S-CSCF or ProSe AS. This operator policy information may be used to analyze/evaluate/determine whether the UE is capable of receiving ProSe by the S-CSCF and/or the ProSe AS. Further, the operator policy information may also be defined and applied with the various granularities described above in relation to the ProSe capability information of the UE.

Moreover, the S-CSCF and/or the ProSe AS may determine whether ProSe is supportable based on whether the network to which the IMS UE is attached is a home network or a visited network (e.g., roaming status). This serves to appropriately determine whether ProSe is supportable by reflecting the operator policy or the user preference which is variable based on the roaming status.

In addition, the S-CSCF and/or the ProSe AS may determine whether ProSe is supportable based on the congestion status of the network (e.g., RAN or core network) to which the IMS UE is attached. For example, the S-CSCF and/or the ProSe AS may determine whether to permit ProSe for the IMS UE in such a manner that ProSe is permitted when the network is congested while ProSe is not permitted when the network is not congested.

Scheme 2

Scheme 2 relates to an operation for performing communication through a direct data path by an IMS UE which originates or updates a session.

For example, when an IMS UE originates a session, the IMS UE may transmit an SIP INVITE request message by including information for requesting communication through a direct data path with a peered UE for all or a part of media for configuring the session. When the IMS UE updates a session, the IMS UE may transmit an SIP re-INVITE request message or an SIP UPDATE message by including information for requesting communication through a direct data path with a peered UE for all or a part of media to be updated. Alternatively, when the IMS UE updates a session, the IMS UE may transmit an SIP re-INVITE request message or an SIP UPDATE message by including information for requesting to switch a direct data path of communication with a peered UE to an infrastructure data path for all or a part of media to be updated. That is, the above-described session update may be performed to add new media to the existing session or to change a data path of media for configuring the existing session (from an infrastructure data path to a direct data path or vice versa).

Alternatively, when the IMS UE which originates or updates a session receives a response message for requesting communication through a direct data path from a peered UE during session setup or update, the IMS UE (which originates or updates the session) may progress session setup or update by transmitting response information for accepting direct path communication in response to the request. For example, if the peered UE transmits an SIP 183 session progress message including information for requesting communication through a direct data path, the IMS UE which originates or updates the session and receives this message may transmit an SIP Provisional Acknowledgement (PRACK) message by including response information for accepting direct path communication.

Hereinafter, information for requesting communication through a direct data path with a peered UE, which is included in an SIP message (e.g., SIP INVITE request message, SIP re-INVITE request message, SIP UPDATE request message or SIP PRACK message) as described above (this information includes information for requesting to switch a direct data path of communication with a peered UE to an infrastructure data path) is referred to as "ProSe communication request information", response or report information for accepting communication through a direct data path (this information includes response information for accepting to switch a direct data path of communication with a peered UE to an infrastructure data path) is referred to as "ProSe communication response information". The above "ProSe communication request information" and the "ProSe communication response information" may configure ProSe communication information for all or only a part of media for configuring a session.

Here, the IMS UE may include ProSe communication request information thereof in a session originate or session update request message based on one or more information described below.

i) ProSe capability information of an IMS UE which terminates a session or receives a session update request may be used. That is, as will be proposed below in Scheme 3, the IMS UE which terminates a session or receives a session update request may transmit an SIP message by including ProSe capability information thereof, and this information may be used when the IMS UE which originates a session or requests to update a session determines whether to request communication through a direct data path.

ii) Information about proximity between the IMS UE which originates a session or requests to update a session and the IMS UE which terminates a session or receives a session update request may be used. For example, the IMS UE which originates a session or requests to update a session knows that ProSe communication with a peered UE (e.g., IMS UE which terminates a session or receives a session update request) is possible, the IMS UE may include ProSe communication request information for requesting communication through a direct data path in an SIP request message. On the other hand, when the IMS UE performs ProSe communication with the peered UE, if it is detected that ProSe communication is not possible any more or soon, the IMS UE may include ProSe communication request information for requesting communication through an infrastructure data path in an SIP request message.

The ProSe communication request (or response) information may be included in an SIP message (e.g., SIP INVITE request message, SIP re-INVITE request message, SIP UPDATE request message or SIP PRACK message) using one or more of a header field of the SIP message, a body parameter of the header field, a tag field of the header field and a Session Description Protocol (SDP) field. Here, the parameters of the SIP message may use (or reuse) conventionally defined parameters or may be defined as new parameters.

Additionally, the IMS UE which originates or updates a session may transmit the SIP message by including ProSe capability information (see Scheme 1) thereof in addition to the ProSe communication request (or response) information.

Scheme 3

Scheme 3 relates to an operation for performing communication through a direct data path by an IMS UE which terminates a session or receives a session update request.

An IMS UE (e.g., IMS UE which terminates a session) which receives a session setup request message (e.g., SIP INVITE request message) including ProSe communication request information (see Scheme 2) from a peered UE (e.g., IMS UE which originates a session) may progress session setup by including information for accepting communication through a direct data path. For example, the IMS UE which terminates a session may transmit an SIP 183 session progress message by including "ProSe communication response information". An IMS UE (e.g., IMS UE which receives a session update request) which receives a session update request message (e.g., SIP re-INVITE request message or SIP UPDATE request message) including ProSe communication request information (see Scheme 2) from a peered UE (e.g., IMS UE which updates a session) may progress session update by including information for accepting communication through a direct data path. For example, the IMS UE which receives a session update request may transmit an SIP 200 OK message by including "ProSe communication response information".

Alternatively, when an IMS UE receives a session setup request message (e.g., SIP INVITE request message) not including ProSe communication request information from a peered UE, if the IMS UE (e.g., IMS UE which terminates a session) desires to communicate through a direct data path with the peered UE (e.g., IMS UE which originates a session), the IMS UE may transmit a response message (e.g., response message to a session setup request) by including ProSe communication request information for all or a part of media for configuring a session. For example, the IMS UE which terminates a session may transmit an SIP 183 session progress message by including the ProSe communication request information. When an IMS UE receives a session update request message (e.g., SIP re-INVITE request message or SIP UPDATE request message) not including ProSe communication request information from a peered UE, if the IMS UE (e.g., IMS UE which receives a session update request) desires to communicate through a direct data path with the peered UE (e.g., IMS UE which originates session update), the IMS UE may transmit a response message (e.g., response message to a session update request) by including ProSe communication request information for all or a part of media for configuring a session. For example, the IMS UE which receives a session update request may transmit an SIP 200 OK message by including the ProSe communication request information.

Here, even when the session setup or update request message received from the IMS UE which originates a session or requests to update a session does not include ProSe communication request information, the IMS UE which terminates a session or receives a session update request may include ProSe communication request information thereof in a response message based on one or more information described below.

i) ProSe capability information of an IMS UE which originates a session or requests to update a session may be used. That is, as proposed above in Scheme 2, the IMS UE which originates a session or requests to update a session may transmit an SIP INVITE request message by including ProSe capability information thereof, and this information may be used when the IMS UE which terminates a session or receives a session update request determines whether to request communication through a direct data path.

ii) Information about proximity between the IMS UE which terminates a session or receives a session update request and the IMS UE which originates a session or requests to update a session may be used. For example, the IMS UE which terminates a session or receives a session update request knows that ProSe communication with a peered UE (e.g., IMS UE which originates a session or requests to update a session) is possible, the IMS UE may include ProSe communication request information for requesting communication through a direct data path in an SIP response message. On the other hand, when the IMS UE performs ProSe communication with the peered UE, if it is detected that ProSe communication is not possible any more or soon, the IMS UE may include ProSe communication request information for requesting communication through an infrastructure data path in an SIP response message.

The ProSe communication request information or the ProSe communication response information may be included in an SIP message (e.g., SIP 183 session progress message) using one or more of a header field of the SIP message, a body parameter of the header field, a tag field of the header field and a Session Description Protocol (SDP) field. Here, the parameters of the SIP message may use (or reuse) conventionally defined parameters or may be defined as new parameters.

Additionally, the IMS UE which terminates a session or receives a session update request may transmit the SIP message by including ProSe capability information (see Scheme 1) thereof in addition to the ProSe communication request (or response) information.

Scheme 4

Scheme 4 relates to an interaction operation between ProSe and presence service.

The presence service refers to a service using information indicating that communication with a peer is possible (e.g., presence information). That is, the presence information may be an indicator indicating communication ability and willingness of a potential communication peer.

An AS for proving presence service function (e.g., presence service server or resource list server) may also provide ProSe function. Otherwise, an AS for proving ProSe function (e.g., ProSe AS) may also provide presence service function. Alternatively, an AS for proving presence service function and an AS for proving ProSe function may interact with each other directly (e.g., without going via another node) or indirectly (e.g., via another node). Hereinafter, (one or more) nodes capable of providing both ProSe and presence service are collectively referred to as presence/ProSe AS (P/P AS).

When a certain UE subscribes to a service using presence information of another UE and/or another UE group (e.g., target UE (group)), the UE may transmit a presence service subscription request message (e.g., SIP SUBSCRIBE message) to the P/P AS by including P/P subscription information. The P/P subscription information may include one or more of ProSe capability information (see Scheme 1) of the UE and information about a condition to notify presence information of the target UE (group). Here, the condition to notify presence information of the target UE (group) may be configured as, for example, a case when presence information of the target UE or a UE included in the target UE group is changed, or a case when the target UE or a UE included in the target UE group enters a range in which direct communication with the UE subscribed to the presence service is possible (e.g., proximity range) (or vice versa).

In addition, when a certain UE publishes presence information thereof, P/P publication information of the UE may be added to a publication request message (e.g., SIP PUBLISH message) to be transmitted to the P/P AS. The P/P publication information may include ProSe capability information (see Scheme 1) of the UE. A change in the P/P publication information can be a condition to transmit the publication request message by the UE.

Further, when the P/P AS receives the presence service subscription request message (e.g., SIP SUBSCRIBE message) from the UE, the P/P AS may transmit a response message (e.g., SIP 200 OK message) thereto by including P/P subscription response information. The P/P subscription response information may include one or more of information indicating whether a network is capable of providing ProSe, and information about enabled/disabled state of ProSe capability of the UE.

Moreover, when the P/P AS receives the publication request message (e.g., SIP PUBLISH message) of the presence information from the UE, the P/P AS may transmit a response message (e.g., SIP 200 OK message) thereto by including P/P publication response information. The P/P publication response information may include one or more of information indicating whether a network is capable of providing ProSe, and information related to enabled/disabled state of ProSe capability of the UE.

For example, the information related to enabled/disabled state of ProSe capability of the UE which can be included in the P/P subscription response information and/or the P/P publication response information may be information related to a request/indication to enable one or more disabled ProSe capabilities of the UE (or a user or subscriber related to the UE). Further, the information related to enabled/disabled state of ProSe capability of the UE may be information related to a request/indication to disable one or more enabled ProSe capabilities of the UE (or a user or subscriber related to the UE).

In addition, the P/P AS may transmit a presence information notification message (e.g., SIP NOTIFY message) to the UE subscribed to the presence service by including P/P notification information. The P/P notification information may include one or more of ProSe capability information of the target UE or a UE included in the target UE group (the ProSe capability information may not be included if a corresponding ProSe capability is disabled), or information indicating whether direct communication with the target UE or a UE included in the target UE group is possible. Here, a change in at least one information included in the P/P notification information can be a condition to transmit the presence information notification message by the P/P AS.

Besides, the P/P AS may acquire necessary information from and/or interact with other nodes (e.g., HSS, MME/SGSN, eNodeB and IMS node) to perform the operation proposed in Scheme 4.

Scheme 5

Scheme 5 relates to an operation for transmitting a result of performing ProSe to a network by an IMS UE.

When an IMS UE terminates a session (e.g., transmits an SIP BYE message) or cancels a session (e.g., transmits an SIP CANCEL message), the IMS UE may transmit an SIP message to a network by including ProSe result information. Unlike this or additionally, the IMS UE may save the ProSe result information and transmit an SIP REGISTER message to the network by including this information when the IMS UE performs IMS re-registration to or de-registration from a home network.

The ProSe result information may include one or more of information indicating success or failure of setup of a direct data path, information about the amount of data and/or a time for communication through a direct data path, charging information (e.g., time for which a direct data path is maintained), information about the types of media (or contents) communicated through a direct data path, information about the number of peered UEs with which communication is performed through direct data paths, information about directionality of a direct data path (e.g., unidirectional communication from UE-1 to UE-2, unidirectional communication from UE-2 to UE-1, bidirectional communication between UE-1 and UE-2, or broadcasting from UE-1 to other UEs), information about an access type (e.g., E-UTRAN or WLAN) used for a direct data path, and information about the number and types of bearers used for a direct data path.

The ProSe result information may be included in an SIP message (e.g., SIP BYE message, SIP CANCEL message or SIP REGISTER message) using one or more of a header field of the SIP message, a body parameter of the header field, a tag field of the header field, a Session Description Protocol (SDP) field and an Extensible Markup Language (XML) body field. Here, the parameters of the SIP message may use (or reuse) conventionally defined parameters or may be defined as new parameters.

The SIP messages used above in Scheme 1 to Scheme 5 are merely exemplary and various conventional SIP messages or SIP messages newly defined for the present invention may also be used.

The followings may be considered to apply Scheme 1 to Scheme 5.

The followings may be considered to apply Scheme 1 to Scheme 5.

Scheme 2 (e.g., scheme for including ProSe communication request (or response) information in an SIP message to be transmitted by an IMS UE which originates a session or requests to update a session) and Scheme 3 (e.g., scheme for including ProSe communication request (or response) information in an SIP message to be transmitted by an IMS UE which terminates a session or receives a session update request) should be performed together with the operation of Scheme 1 (e.g., scheme for including ProSe capability information in an IMS registration related SIP message to be transmitted by an IMS UE), or can be performed independently without the operation of Scheme 1. For example, if Scheme 2/Scheme 3 are performed independently from Scheme 1, although an IMS UE does not report ProSe capability information to a network during IMS registration, any of two UEs may request communication through a direct data path between the UEs during session setup/update therebetween and thus ProSe may be provided.

In addition, Scheme 4 (e.g., scheme for interaction between ProSe and presence service) should be performed together with the operation of Scheme 1 (e.g., scheme for including ProSe capability information in an IMS registration related SIP message to be transmitted by an IMS UE), or can be performed independently without the operation of Scheme 1.

Further, in Scheme 2 and Scheme 3, even when an IMS UE which originates a session or requests to update a session (hereinafter referred to as UE-1) and/or an IMS UE which terminates a session or receives a session update request (hereinafter referred to as UE-2) request (or have intention to perform) communication through a direct data path, the network can make a rejection. Meanwhile, even when UE-1 and UE-2 do not request (or do not have intention to perform) communication through a direct data path, the network can give an indication to perform communication through a direct data path between UE-1 and UE-2. Alternatively, the network can give an indication to switch a direct data path of communication between UE-1 and UE-2 to an infrastructure data path. The indication may be included in an SIP message exchanged between UE-1 and UE-2, or a network node may generate an additional message and transmit the message to UE-1 and/or UE-2. Here, the network may be a network node, e.g., S-CSCF or ProSe AS, for serving UE-1, or a network node, e.g., S-CSCF or ProSe AS, for serving UE-2.

A network node may determine to permit/refuse/indicate communication through a direct data path between UEs or to switch the direct data path to an infrastructure data path based on one or more of ProSe capability information of a UE (or a user or subscriber related to the UE), information indicating whether a network is capable of providing ProSe, load/congestion status of RAN, load/congestion status of a core network, information about the location of UEs related to session setup, i.e., information about a specific cell, specific eNodeB or specific tracking area (TA) on which a corresponding UE is camped (for example, a location which is set by an operator to use ProSe for public safety, e.g., a place of frequent accidents such as seashore or mountain, information about a specific group or contact list to which UEs related to session setup belong, proximity information between UEs and proximity communicability information between UEs. These types of information can be acquired by the network node (S-CSCF or ProSe AS) from UEs and/or other network nodes (e.g., HSS, MME/SGSN and Policy Charging and Rules Function (PCRF)).

Authentication/authorization for ProSe-based communication between UE-1 and UE-2 and/or charging for ProSe-based communication may be performed by one or more of network nodes including a network node for serving UE-1 (e.g., ProSe AS, S-CSCF and/or P-CSCF related to UE-1) and a network node for serving UE-2 (e.g., ProSe AS, S-CSCF and/or P-CSCF related to UE-2).

The network node for performing authentication/authorization/charging may interact with other network nodes or transmit a result of authentication/authorization/charging to other network nodes.

For example, in a session setup procedure between UE-1 and UE-2, a ProSe AS for serving UE-1 and a ProSe AS for serving UE-2 may respectively authenticate/authorize whether UE-1 and UE-2 are capable of performing ProSe-based communication.

In addition, a P-CSCF and/or S-CSCF for serving UE-1 and a P-CSCF and/or S-CSCF for serving UE-2 may transmit information necessary for charging (e.g., ID of UE-1, ID of UE-2, information about media for configuring a session, a time to start charging, etc.) to a network node which is in charge of charging (e.g., Charging Data Function (CDF) or Online Charging System (OCS)) in the session setup procedure. Here, the information necessary for charging may be determined according to the descriptions related to Charging Data Record (CDR) of 3GPP TS 32.225. If the session between the UEs is terminated, the P-CSCF and/or S-CSCF for serving UE-1 and the P-CSCF and/or S-CSCF for serving UE-2 may transmit a message to request to stop charging to the network node in charge of charging (e.g., CDF or OCS). Like the session setup/update operation, the charging operation may be performed in association with a session. The information necessary for charging related to ProSe may be transmitted whenever such information needs to be transmitted to the network node in charge of charging (e.g., when the network discovers that ProSe is possible between UEs).

Further, when the network node determines to use ProSe-based communication (e.g., after authentication and/or authorization for ProSe) or detects that use of ProSe-based communication is permitted, the network node may allow the RAN to control radio resources necessary for direct path communication. For example, when UE-1 transmits data to UE-2 through a direct data path using an LTE spectrum, the network node may allow an eNodeB to perform, for example, scheduling for direct path communication between the UEs.

Besides, the network node which has determined to use ProSe-based communication may allow a RAN (e.g., eNodeB) to control radio resources necessary for direct communication by transmitting a ProSe permission notification message to the eNodeB directly or via another network node. A conventional message may be modified and used or a newly defined message may be used as the ProSe permission notification message.

For example, if a ProSe AS for serving UE-1 authenticates/authorizes UE-1 and determines to use ProSe-based communication, the ProSe AS may transmit the ProSe permission notification message to an eNodeB for serving UE-1. The ProSe permission notification message may be transmitted from the ProSe AS to the eNodeB through various paths, e.g., a path in order of ProSe AS, PCRF, P-GW, S-GW and eNodeB, or a path in order of ProSe AS, S-CSCF, P-CSCF, PCRF, P-GW, S-GW and eNodeB.

As another example, if a P-CSCF for serving UE-1 detects that use of ProSe-based communication is permitted in the session setup procedure, the P-CSCF may transmit the ProSe permission notification message to the eNodeB for serving UE-1. The ProSe permission notification message may be transmitted from the P-CSCF to the eNodeB through various paths, e.g., a path in order of P-CSCF, PCRF, P-GW, S-GW and eNodeB.

The IMS-based ProSe operation according to the present invention is not restrictively applied to the 3GPP LTE/EPC network but is applicable to all UMTS/EPS mobile communication systems including both a 3GPP access network (e.g., UTRAN/GERAN/E-UTRAN) and a non-3GPP access network (e.g., WLAN). In addition to the UMTS/EPS mobile communication systems, the IMS-based ProSe operation according to the present invention is also applicable to all other radio mobile communication system environments to which control of a network is applied.

A description is now given of specific embodiments of the above-described various schemes of the present invention with reference to the accompanying drawings. In the following description, network nodes and transmitted/received messages/information related to operations of the present invention should not be construed in a limiting sense and the IMS-based ProSe operation proposed by the present invention may be performed using some of the network nodes and some of the messages/information or may additionally include interaction with other network nodes (e.g., P-CSCF, I-CSCF and HSS) which are not illustrated or mentioned.

Embodiment 1

Figure 6:
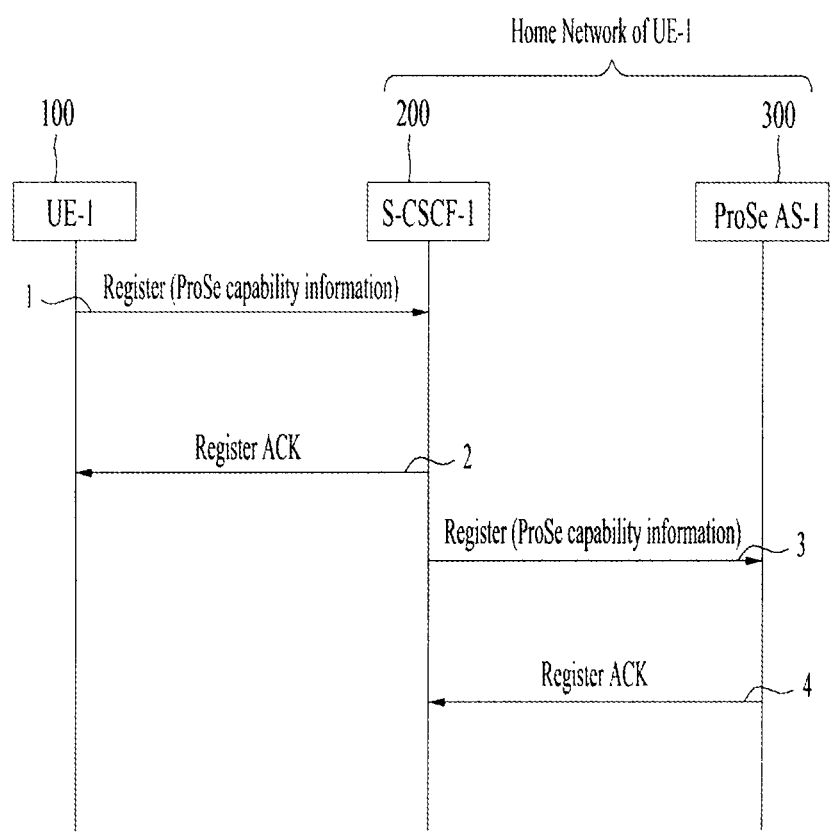
FIG. 6 is a view for describing an IMS registration procedure for an IMS-based ProSe operation according to the present invention.

FIG. 6 is a view for describing an IMS registration procedure for an IMS-based ProSe operation according to the present invention.

In step 1 of FIG. 6, UE-1 100 may transmit an IMS registration request message (e.g., SIP REGISTER message) to S-CSCF-1 200 to be registered in a home network of the UE-1 100. In this case, ProSe capability information (see Scheme 1) may be included in the registration request message.

In step 2 of FIG. 6, the S-CSCF-1 200 which has received the IMS registration request message from the UE-1 100 may store the ProSe capability information. The S-CSCF-1 200 which has received the IMS registration request message from the UE-1 100 may transmit a registration acknowledgement message (e.g., SIP 200 OK message) to the UE-1 100.

In step 3 of FIG. 6, the S-CSCF-1 200 may transmit a registration request message to ProSe AS-1 300 for serving the UE-1 100 to request registration of the UE-1 100. In this case, the S-CSCF-1 200 may include the ProSe capability information included in the registration request message by the UE-1 100 in step 1, in the registration request message to be transmitted to the ProSe AS-1 300.

In step 4 of FIG. 6, the ProSe AS-1 300 which has receives the IMS registration request message from the UE-1 100 may store the ProSe capability information. After that, the ProSe AS-1 300 may transmit a registration acknowledgement message to the S-CSCF-1 200.

In addition, if the ProSe capability information of the UE-1 100 is changed, the UE-1 100 may report it to the network by performing the IMS registration procedure as illustrated in FIG. 6.

Embodiment 2

Figure 7:
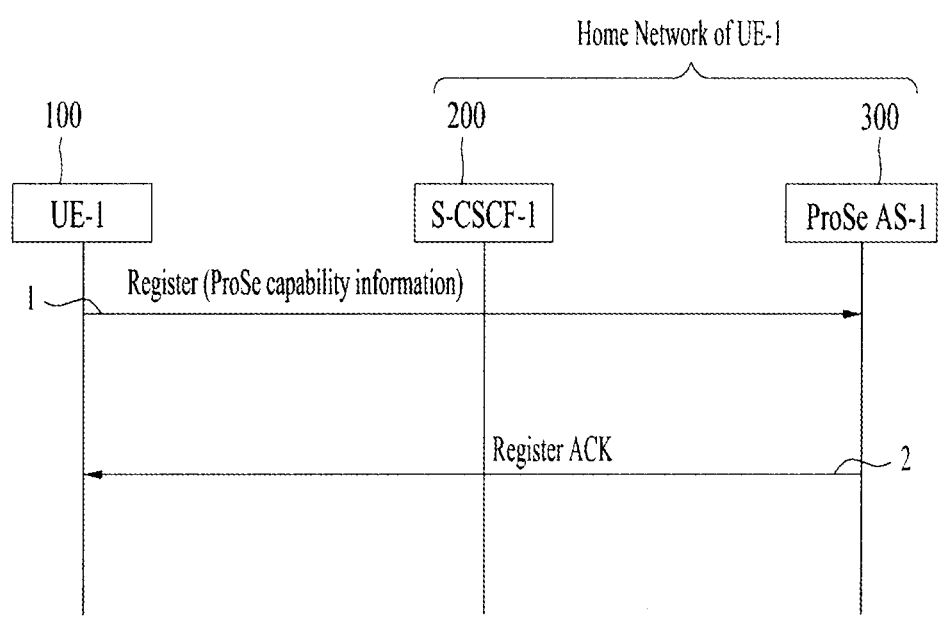
FIG. 7 is a view for describing a ProSe capability information registration procedure for the IMS-based ProSe operation according to the present invention.

FIG. 7 is a view for describing a ProSe capability information registration procedure for the IMS-based ProSe operation according to the present invention.

In step 1 of FIG. 7, UE-1 100 may transmit (or register/update) ProSe capability information thereof to ProSe AS-1 300 using an interface (e.g., Ut interface) with the ProSe AS-1 300.

In step 2 of FIG. 7, the ProSe AS-1 300 may transmit a registration response message (e.g., ACK message) to the UE-1 100.

The interface between the UE-1 100 and the ProSe AS-1 300 may use various protocols, e.g., Hypertext Transfer Protocol (HTTP) or SIP.

Embodiment 3

Figure 8:
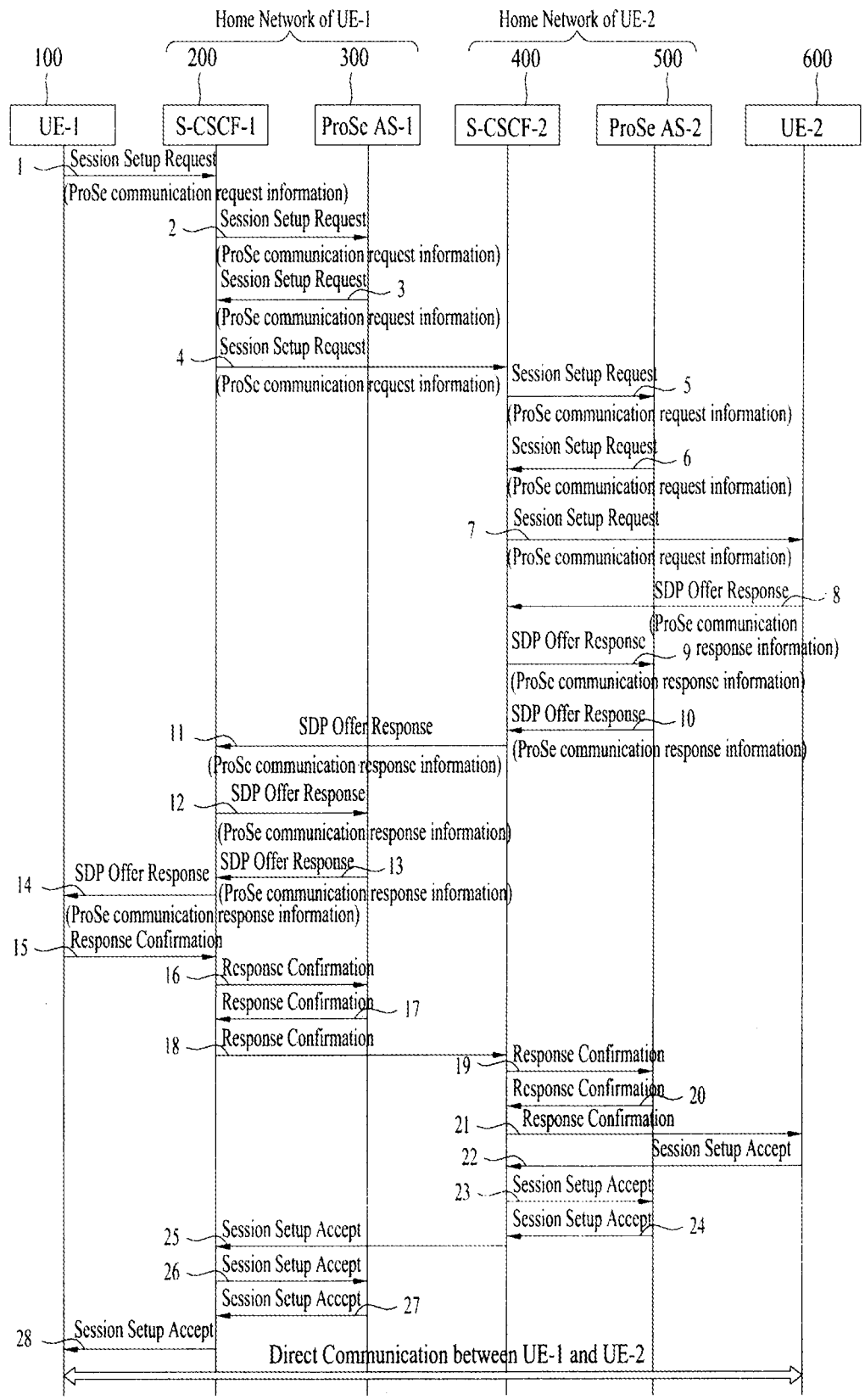
FIG. 8 is a view for describing an exemplary IMS session setup procedure for the IMS-based ProSe operation according to the present invention.

FIG. 8 is a view for describing an exemplary IMS session setup procedure for the IMS-based ProSe operation according to the present invention.

In step 1 of FIG. 8, UE-1 100 may transmit a session setup request message (e.g., SIP INVITE message) to S-CSCF-1 200 to set up a session with UE-2 600. In this case, information for requesting communication through a direct data path (e.g., ProSe communication request information described above in relation to Scheme 2) with the UE-2 600 by the UE-1 100 may be included in the session setup request message.

In step 2 of FIG. 8, the S-CSCF-1 200 for serving the UE-1 100 may transmit the received session setup request message to ProSe AS-1 300 for serving the UE-1 100.

In steps 3 to 7 of FIG. 8, the session setup request message may be delivered from the ProSe AS-1 300 to the UE-2 600 via the S-CSCF-1 200, and S-CSCF-2 400 and ProSe AS-2 500 for serving the UE-2 600.

In step 8 of FIG. 8, the UE-2 600 may transmit a session setup response message to the received session setup request message to the UE-1 100. For example, the session setup response message may be an SDP offer response message (e.g., SIP 183 session progress message) included in the session setup request message. In this case, information for accepting communication through a direct data path (e.g., ProSe communication response information described above in relation to Scheme 3) with the UE-1 100 by the UE-2 600 may be included in the SDP offer response message.

In steps 9 to 14 of FIG. 8, the SDP offer response message may be delivered from the S-CSCF-2 400 to the UE-1 100 via the ProSe AS-2 500, the S-CSCF-1 200 and the ProSe AS-1 300.

In steps 15 to 21 of FIG. 8, the UE-1 100 may transmit a confirmation message (e.g., SIP PRACK message) of the SDP offer response message to the UE-2 600 via the network nodes.

In steps 22 to 28 of FIG. 8, the UE-2 600 may transmit a session setup acceptance message (e.g., SIP 200 OK message) to the UE-1 100 via the network nodes.

As such, direct communication may be performed between the UE-1 100 and the UE-2 600 using a direct data path for all or a part of media for configuring the IMS session set as described above. That is, in the embodiment of FIG. 8, communication through a direct data path may be performed for all or only a part of media for configuring the IMS session. If communication through a direct data path is performed for only a part of media for configuring the IMS session, communication through an infrastructure data path is performed for the other media.

In addition, when the IMS session through a direct data path between the UE-1 100 and the UE-2 600 is terminated/canceled, ProSe result information (see Scheme 5) may be included in an SIP message to be transmitted from the UE-1 100 and/or the UE-2 600 to the network.

Meanwhile, according to a modified embodiment of FIG. 8, the UE-1 100 may include the ProSe communication request information in the acknowledgement message of the SDP offer response message of step 15 instead of the session setup request message of step 1. In this case, the UE-2 600 may include the ProSe communication response information in the session setup acceptance message of step 22 instead of the SDP offer response message of step 8.

Additionally, before the IMS session setup procedure of the current embodiment is performed, the UE-1 100 may discover the UE-2 600 to detect that direct communication therebetween is possible. Alternatively, after the UE-2 600 receives the session setup request message of step 7 (or a message including an SDP offer), the UE-2 600 may discover the UE-1 100. If the UE-2 600 has discovered the UE-1 100, the ProSe communication response information to be included in the SDP offer response message may be configured based on the result of discovery.

Further, a network node (e.g., the S-CSCF-1 200, the S-CSCF-2 400, the ProSe AS-1 300, the ProSe AS-2 500, and/or another IMS node or non-IMS node) may discover whether direct communication is possible between the UE-1 100 and the UE-2 600. This network-side discovery operation may be performed by the network without a request of the UE-1 100 or the UE-2 600. Besides, information for explicitly or implicitly requesting (or instructing) the network side to check (or discover) ProSe communicability may be included in a message to be transmitted from the UE-1 100 and/or the UE-2 600 in the IMS session setup procedure.

Here, irrespective of whether a subject of discovery operation is a UE or a network node, the subject of discovery may acquire a result of the discovery operation through interaction with the UE and/or other network nodes.

The above description related to the discovery operation may be equally applied to other embodiments of the present invention.

Embodiment 4

Figure 9:
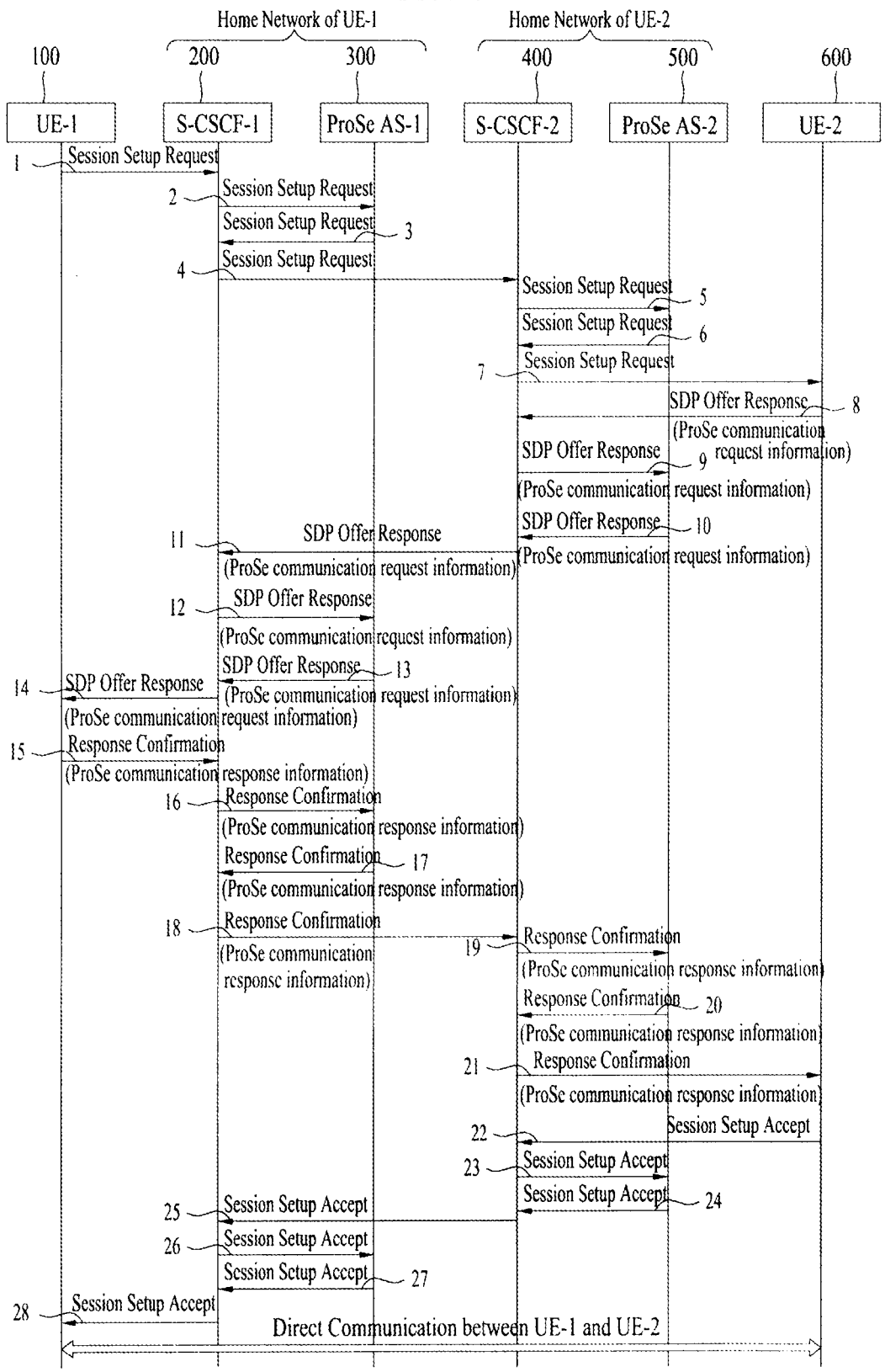
FIG. 9 is a view for describing another exemplary IMS session setup procedure for the IMS-based ProSe operation according to the present invention.

FIG. 9 is a view for describing another exemplary IMS session setup procedure for the IMS-based ProSe operation according to the present invention.

In step 1 of FIG. 9, UE-1 100 may transmit a session setup request message (e.g., SIP INVITE message) to S-CSCF-1 200 to set up a session with UE-2 600.

In step 2 of FIG. 9, the S-CSCF-1 200 for serving the UE-1 100 may transmit the received session setup request message to ProSe AS-1 300 for serving the UE-1 100.

In steps 3 to 7 of FIG. 9, the session setup request message may be delivered from the ProSe AS-1 300 to the UE-2 600 via the S-CSCF-1 200, and S-CSCF-2 400 and ProSe AS-2 500 for serving the UE-2 600.

In step 8 of FIG. 9, the UE-2 600 may transmit a session setup response message to the received session setup request message to the UE-1 100. For example, the session setup response message may be an SDP offer response message (e.g., SIP 183 session progress message) included in the session setup request message. In this case, information for requesting communication through a direct data path (e.g., ProSe communication request information described above in relation to Scheme 3) with the UE-1 100 by the UE-2 600 may be included in the SDP offer response message.

In steps 9 to 14 of FIG. 9, the SDP offer response message may be delivered from the S-CSCF-2 400 to the UE-1 100 via the ProSe AS-2 500, the S-CSCF-1 200 and the ProSe AS-1 300.

In step 15 of FIG. 9, the UE-1 100 may transmit a confirmation message (e.g., SIP PRACK message) of the SDP offer response message. In this case, information for accepting communication through a direct data path (e.g., ProSe communication response information described above in relation to Scheme 2) with the UE-2 600 by the UE-1 100 may be included in the confirmation message of the SDP offer response message.

In steps 16 to 21 of FIG. 9, the S-CSCF-1 200 may transmit the confirmation message of the SDP offer response message to the UE-2 600 via the other network nodes.

In steps 22 to 28 of FIG. 9, the UE-2 600 may transmit a session setup acceptance message (e.g., SIP 200 OK message) to the UE-1 100 via the network nodes.

As such, direct communication may be performed between the UE-1 100 and the UE-2 600 using a direct data path for all or a part of media for configuring the IMS session set as described above.

In addition, when the IMS session through a direct data path between the UE-1 100 and the UE-2 600 is terminated/canceled, ProSe result information (see Scheme 5) may be included in an SIP message to be transmitted from the UE-1 100 and/or the UE-2 600 to the network.

Embodiment 5

Figure 10:
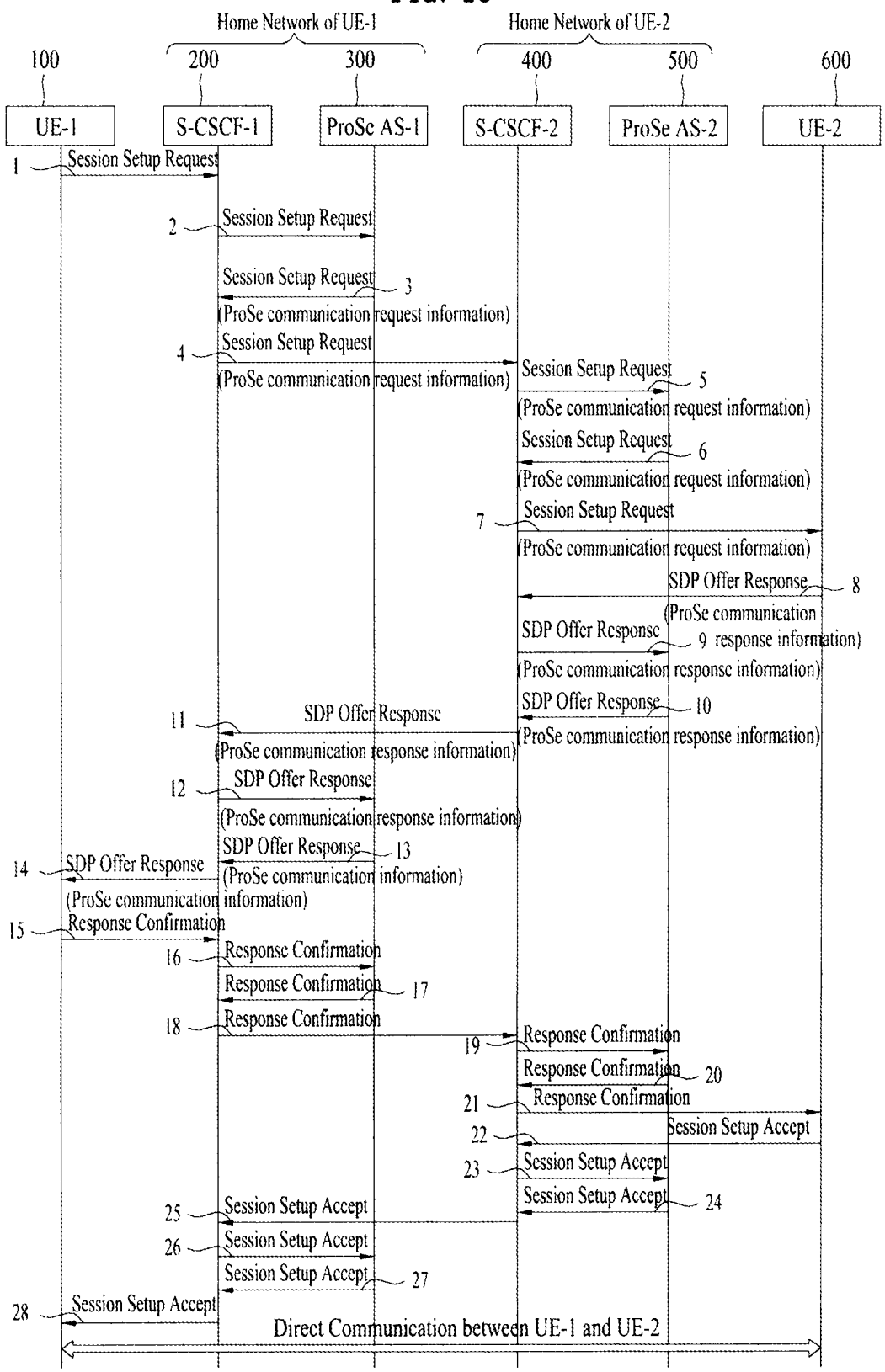
FIG. 10 is a view for describing another exemplary IMS session setup procedure for the IMS-based ProSe operation according to the present invention.

FIG. 10 is a view for describing another exemplary IMS session setup procedure for the IMS-based ProSe operation according to the present invention.

While an operation for including ProSe communication request information in an SIP message and transmitting the message by a UE has been described above in relation to FIGS. 8 and 9, a description is now given of an operation for including ProSe communication request information in an SIP message and transmitting the message by a network node with reference to FIG. 10.

In step 1 of FIG. 10, UE-1 100 may transmit a session setup request message (e.g., SIP INVITE message) to S-CSCF-1 200 to set up a session with UE-2 600.

In step 2 of FIG. 10, the S-CSCF-1 200 for serving the UE-1 100 may transmit the received session setup request message to ProSe AS-1 300 for serving the UE-1 100.

In step 3 of FIG. 10, the ProSe AS-1 300 may include information for requesting communication through a direct data path (e.g., ProSe communication request information) between the UE-1 100 and the UE-2 600, in the session setup request message to be delivered to the S-CSCF-1 200.

In steps 4 to 7 of FIG. 10, the session setup request message may be delivered from the S-CSCF-1 200 to the UE-2 600 via the S-CSCF-1 200, and S-CSCF-2 400 and ProSe AS-2 500 for serving the UE-2 600.

In step 8 of FIG. 10, the UE-2 600 may transmit a session setup response message to the received session setup request message to the UE-1 100. For example, the session setup response message may be an SDP offer response message (e.g., SIP 183 session progress message) included in the session setup request message. In this case, information for accepting communication through a direct data path (e.g., ProSe communication response information described above in relation to Scheme 3) with the UE-1 100 by the UE-2 600 may be included in the SDP offer response message.

In steps 9 to 12 of FIG. 10, the SDP offer response message may be delivered from the S-CSCF-2 400 to the ProSe AS-1 300 via the ProSe AS-2 500 and the S-CSCF-1 200.

In steps 13 and 14 of FIG. 10, the ProSe AS-1 300 may check the ProSe communication response information of the UE-2 600 which is included in the SDP offer response message. As such, the ProSe AS-1 300 may transmit the SDP offer response message including information for instructing the UE-1 100 to perform direct communication with the UE-2 600, information necessary for direct communication, etc., to the UE-1 100 via the S-CSCF-1 200.

In steps 15 to 21 of FIG. 10, the UE-1 100 may transmit a confirmation message (e.g., SIP PRACK message) of the SDP offer response message to the UE-2 600 via the network nodes.

In steps 22 to 28 of FIG. 10, the UE-2 600 may transmit a session setup acceptance message (e.g., SIP 200 OK message) to the UE-1 100 via the network nodes.

As such, direct communication may be performed between the UE-1 100 and the UE-2 600 using a direct data path for all or a part of media for configuring the IMS session set as described above.

According to a modified embodiment of the FIG. 10, even when the UE-1 100 and the UE-2 600 do not request ProSe communication, a network node (e.g., the ProSe AS-2 500) for serving the UE-2 600 may include ProSe communication request information in an SIP message (e.g., SDP offer response message) directed to the UE-1 100 and transmit the message in step 10. The UE-1 100 which has received this message may include ProSe communication response information in the confirmation message of the SDP offer response message of step 15 and transmit the message.

In addition, when the IMS session through a direct data path between the UE-1 100 and the UE-2 600 is terminated/canceled, ProSe result information (see Scheme 5) may be included in an SIP message to be transmitted from the UE-1 100 and/or the UE-2 600 to the network.

Embodiment 6

Figure 11:
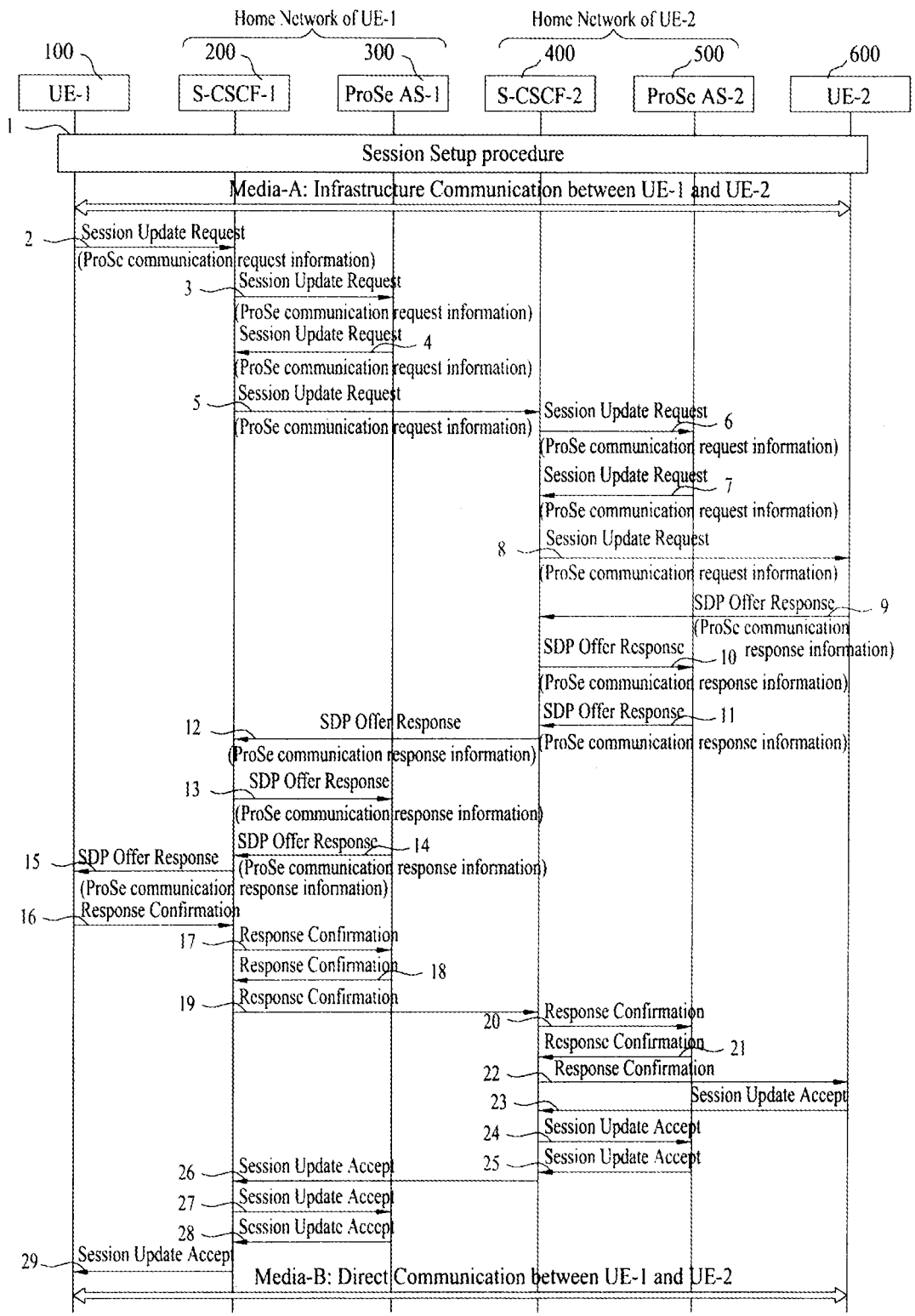
FIG. 11 is a view for describing an IMS session update procedure for the IMS-based ProSe operation according to the present invention.

FIG. 11 is a view for describing an IMS session update procedure for the IMS-based ProSe operation according to the present invention.

In step 1 of FIG. 11, an IMS session for communication through an infrastructure data path is set between UE-1 100 and UE-2 600.

Here, it is assumed that Media-A configures the existing IMS session and that the UE-1 100 desires to add Media-B to the existing IMS session. At this time, Media-A is continuously communicated through the infrastructure data path and the UE-1 100 desires to communicate Media-B through a direct data path with the UE-2 600.

In step 2 of FIG. 11, the UE-1 100 may transmit a session update request message (e.g., SIP re-INVITE message) to S-CSCF-1 200 to update the session with the UE-2 600. In this case, information for requesting communication through a direct data path (e.g., ProSe communication request information) with the UE-2 600 for Media-B may be included in the session update request message.

In step 3 of FIG. 11, the S-CSCF-1 200 for serving the UE-1 100 may transmit the received session update request message to ProSe AS-1 300 for serving the UE-1 100.

In steps 4 to 8 of FIG. 11, the session update request message may be delivered from the ProSe AS-1 300 to the UE-2 600 via the S-CSCF-1 200, and S-CSCF-2 400 and ProSe AS-2 500 for serving the UE-2 600.

In step 9 of FIG. 11, the UE-2 600 may transmit a session update response message to the received session update request message to the UE-1 100. For example, the session update response message may be an SDP offer response message (e.g., SIP 183 session progress message) included in the session update request message. In this case, information for accepting communication through a direct data path (e.g., ProSe communication response information) with the UE-1 100 for Media-B by the UE-2 600 may be included in the SDP offer response message.

In steps 10 to 15 of FIG. 11, the SDP offer response message may be delivered from the S-CSCF-2 400 to the UE-1 100 via the ProSe AS-2 500, the S-CSCF-1 200 and the ProSe AS-1 300.

In steps 16 to 22 of FIG. 11, the UE-1 100 may transmit a confirmation message (e.g., SIP PRACK message) of the SDP offer response message to the UE-2 600 via the network nodes.

In steps 23 to 29 of FIG. 11, the UE-2 600 may transmit a session update acceptance message (e.g., SIP 200 OK message) to the UE-1 100 via the network nodes.

As such, Media-B among media for configuring the IMS session may be communicated between the UE-1 100 and the UE-2 600 using a direct data path.

An operation for updating a session to communicate media added during session progress through an existing infrastructure data path, through a direct data path has been described above in the embodiment of FIG. 11. Additionally, a session update operation may also be performed to switch a data path of all or a part of media for configuring an existing session from an infrastructure data path to a direct data path (or vice versa).

Further, although a UE performs a session update operation in FIG. 11, a network node (e.g., ProSe AS-1 or ProSe AS-2) may also perform a session update operation to switch a data path of all or a part of media for configuring an existing session from an infrastructure data path to a direct data path (or vice versa). The network node may initiate the session update operation using ProSe capability information of UEs with which a session is set, information about proximity therebetween, etc.

In addition, when the IMS session through a direct data path between the UE-1 100 and the UE-2 600 is terminated/canceled, ProSe result information (see Scheme 5) may be included in an SIP message to be transmitted from the UE-1 100 and/or the UE-2 600 to the network.

Embodiment 7

Figure 12:
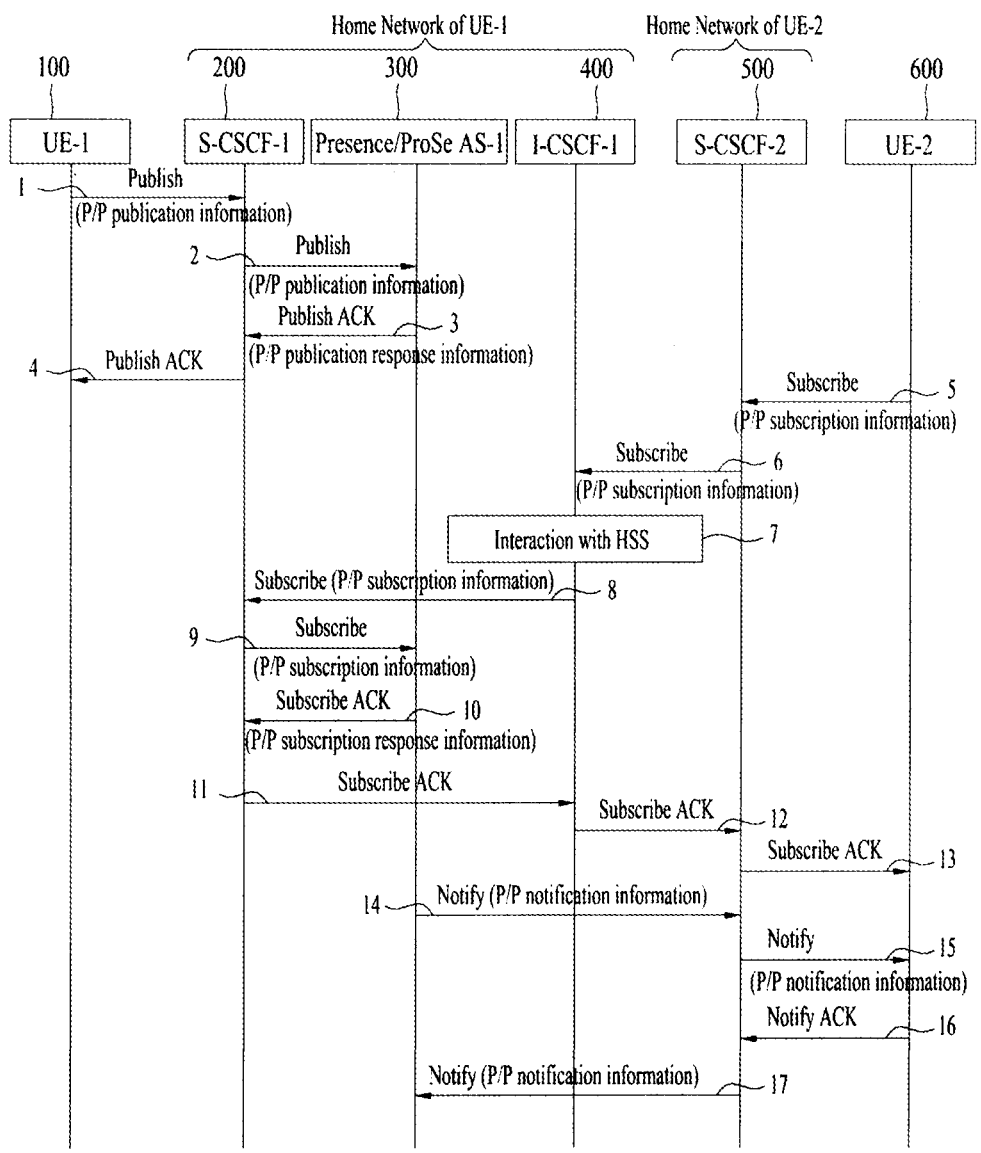
FIG. 12 is a view for describing a ProSe and presence service interaction operation according to the present invention.

FIG. 12 is a view for describing a ProSe and presence service interaction operation according to the present invention.

In step 1 of FIG. 12, UE-1 100 may transmit a publication request message (e.g., SIP PUBLISH message) to publish presence information thereof. In this case, the publication request message may include P/P publication information (see Scheme 4).

In step 2 of FIG. 12, S-CSCF-1 200 may deliver the received publication request message to P/P AS-1 300.

In step 3 of FIG. 12, the P/P AS-1 300 may transmit a response message (e.g., SIP 200 OK message) to the received publication request message. Here, P/P publication response information (see Scheme 4) may be included in the response message to the publication request message.

In step 4 of FIG. 12, the S-CSCF-1 200 may deliver the response message to the UE-1 100.

In step 5 of FIG. 12, UE-2 600 may transmit a subscription request message (e.g., SIP SUBSCRIBE message) for subscribing to a presence information notification service of the UE-1 100. In this case, the subscription request message may include P/P subscription information (see Scheme 4).

In step 6 of FIG. 12, S-CSCF-2 500 may transmit the subscription request message to I-CSCF-1 400 of a home network of the UE-1 100 for which the subscription request message is transmitted.

In step 7 of FIG. 12, the I-CSCF-1 400 may interact with an HSS to check an S-CSCF for serving the UE-1 100.

In step 8 of FIG. 12, the I-CSCF-1 400 may transmit the subscription request message to the S-CSCF-1 200 for serving the UE-1 100.

In step 9 of FIG. 12, the S-CSCF-1 200 may deliver the subscription request message to the P/P AS-1 300.

In step 10 of FIG. 12, the P/P AS-1 300 may transmit a response message (e.g., SIP 200 OK message) to the received subscription request message. In this case, P/P subscription response information (see Scheme 4) may be included in the response message to the subscription request message.

In steps 11 to 13 of FIG. 12, the response message to the subscription request message may be delivered from the S-CSCF-1 200 to the UE-2 600 via the other network nodes.

In step 14 of FIG. 12, after the response message to the received subscription request message is transmitted, the P/P AS-1 300 may transmit a notification message (e.g., SIP NOTIFY message) including current presence information of the UE-1 100 to the UE-2 600. In this case, the notification message may include P/P notification information (see Scheme 4).

In step 15 of FIG. 12, the notification message may be delivered to the UE-2 600 by the S-CSCF-2 500.

In steps 16 and 17 of FIG. 12, the UE-2 600 may transmit a response message (e.g., SIP 200 OK message) to the notification message.

If the UE-2 600 detects that direct communication with the UE-1 100 is possible, from the notification message received in step 15, the UE-2 600 may perform a procedure for starting direct communication with the UE-1 100.

Reference can be made to 3GPP TS 23.141 and TS 24.141 for details of the presence service described above in relation to FIG. 12.

The above-described embodiments of the present invention may be applied independently or two or more embodiments may be applied simultaneously.

Figure 13:
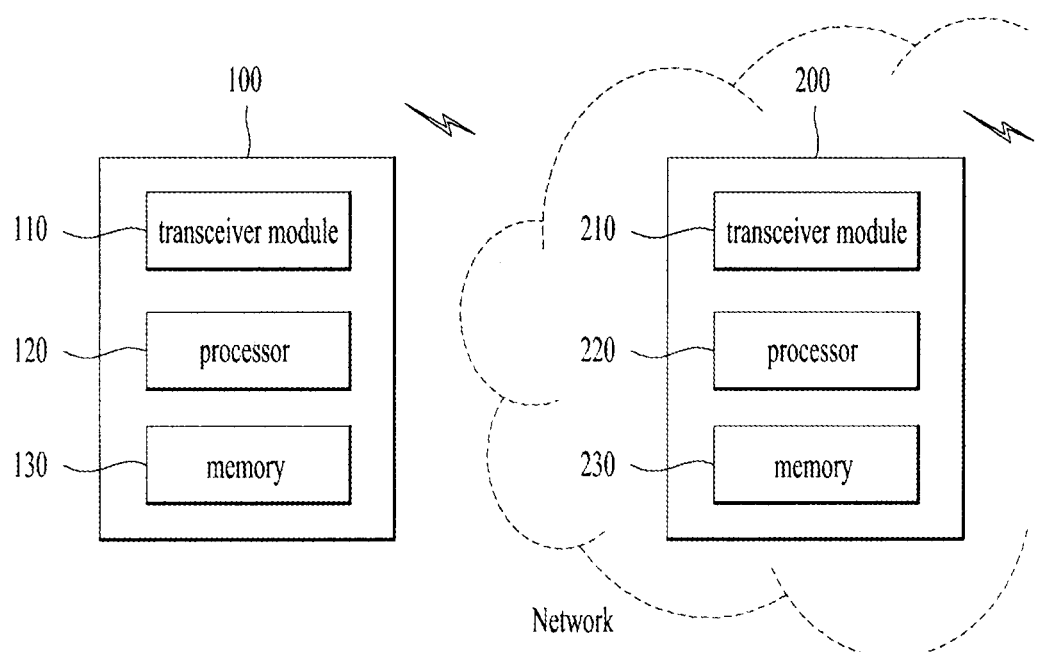
FIG. 13 is a view illustrating the configurations of a UE and a network node according to an embodiment of the present invention.

FIG. 13 is a view illustrating the configurations of a UE 100 and a network node 200 according to an embodiment of the present invention.

Referring to FIG. 13, the UE 100 may include a transceiver module 110, a processor 120 and a memory 130. The transceiver module 110 may be configured to transmit and receive various types of signal, data and information to and from an external device. The UE 100 may be connected to the external device by wire and/or wirelessly. The processor 120 may be configured to provide overall control to the UE 100 and process information, etc. to be transmitted to or received from the external device by the UE 100. In addition, the processor 120 may be configured to perform UE operation proposed by the present invention. The memory 130 may store the processed information, etc. for a predetermined time and replaced by an element such as a buffer (not shown).

Referring to FIG. 13, the network node 200 may include a transceiver module 210, a processor 220 and a memory 230. The transceiver module 210 may be configured to transmit and receive various types of signal, data and information to and from an external device. The network node 200 may be connected to the external device by wire and/or wirelessly. The processor 220 may be configured to provide overall control to the network node 200 and process information, etc. to be transmitted to or received from the external device by the network node 200. In addition, the processor 220 may be configured to perform network node operation proposed by the present invention. The memory 230 may store the processed information, etc. for a predetermined time and replaced by an element such as a buffer (not shown).

In addition, for the detailed configurations of the UE 100 and the network node 200, the above-described embodiments of the present invention may be applied independently or two or more embodiments may be applied simultaneously, and repeated descriptions are omitted for clarity.

The above-described embodiments of the present invention may be implemented by various means, for example, hardware, firmware, software, or a combination thereof.

In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of a module, a procedure, a function, etc. performing the above-described functions or operations. A software code may be stored in a memory unit and executed by a processor. The memory unit may be located inside or outside the processor and exchange data with the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described embodiments of the present invention are applicable to various mobile communication systems.

The invention claimed is:

1. A method for performing Proximity Services (ProSe) by a first Internet protocol Multimedia Subsystem (IMS) User Equipment (UE) in a wireless communication system, the method comprising:
transmitting a presence service subscription request message comprising a condition to transmit presence information of a second IMS UE, wherein the presence information indicates communication ability and willingness of a potential communication peer;

receiving the presence information of the second IMS UE when the condition is met, wherein the condition is met when the second IMS UE enters a range in which direct communication with the first IMS UE is possible;

transmitting, in response to the presence information of the second IMS UE, a first Session Initiation Protocol (SIP) message comprising ProSe communication request information and ProSe capability information to the second IMS UE via a network node, wherein the ProSe capability information indicates whether ProSe communication is available per bearer types, and the bearer types comprise a circuit switched bearer, a packet switched bearer, and an emergency bearer; and receiving a second SIP message comprising ProSe communication response information from the second IMS UE via the network node, wherein the first IMS UE and the second IMS UE communicate to each other through a direct data path without going via an EPC (Evolved Packet Core) in the direct communication, wherein the ProSe capability information includes multi-hop communication information indicating whether the ProSe communication is available in a multi-hop manner, and wherein the multi-hop communication information indicates whether the first IMS UE is capable of serving as an end node on a multi-hop path and whether the first IMS UE is capable of serving as a relay node on the multi-hop path.

2. The method according to claim 1, wherein the second SIP message further comprises ProSe capability information of the second IMS UE.

3. The method according to claim 2, wherein the ProSe capability information further comprises one or more of:
information about one or more capabilities required to perform ProSe, and
information indicating whether the capabilities are enabled.

4. The method according to claim 1, wherein the ProSe capability information further comprises one or more of:
information about one or more capabilities required to perform ProSe, and
information indicating whether the capabilities are enabled.

5. The method according to claim 1, wherein the first SIP message is a session setup request message or a session update request message, and
wherein the second SIP message is a session setup response message or a session update response message.

6. The method according to claim 1, wherein the first SIP message is a session setup response message or a session update response message, and
wherein the second SIP message is a response confirmation message.

7. The method according to claim 1, wherein the network node determines whether to transmit the presence information of the second IMS UE to the first IMS UE based on the condition.

8. The method according to claim 1, wherein, when a session related to one or more of the first SIP message and the second SIP message is terminated or canceled, ProSe result information is transmitted from one of the first IMS UE and the second IMS UE to the network node.

9. The method according to claim 8, wherein the ProSe result information comprises one or more of:
information indicating success or failure of setup of a direct data path,
information about one or more of the amount of data and a time for communication through a direct data path,
charging information,
information about the types of media or contents communicated through a direct data path,
information about the number of peered UEs with which communication is performed through direct data paths,
information about directionality of a direct data path,
information about an access type used for a direct data path, and
information about the number and types of bearers used for a direct data path.

10. The method according to claim 1, wherein the network node comprises one or more of Call Session Control Function (CSCF), ProSe Application Server (AS) and Presence Service Server.

11. A first Internet protocol Multimedia Subsystem (IMS) User Equipment (UE) for performing Proximity Services (ProSe) in a wireless communication system, the first IMS UE comprising:
a transceiver module; and
a processor that controls the transceiver module to:
transmit a presence service subscription request message comprising a condition to notify presence information of a second IMS UE,
receive the presence information of the second IMS UE when the condition is met,
transmit a first Session Initiation Protocol (SIP) message comprising ProSe communication request information and ProSe capability information to the second IMS UE via a network node, using the transceiver module, and
receive a second SIP message comprising ProSe communication response information from the second IMS UE via the network node, using the transceiver module,
wherein the presence information indicates communication ability and willingness of a potential communication peer,
wherein the condition is met when the second IMS UE enters a range in which direct communication with the first IMS UE is possible,
wherein the ProSe capability information indicates whether ProSe communication is available per bearer types, and the bearer types comprise a circuit switched bearer, a packet switched bearer, and an emergency bearer,
wherein the first IMS UE and the second IMS UE communicate to each other through a direct data path without going via an EPC (Evolved Packet Core) in the direct communication,
wherein the ProSe capability information includes multi-hop communication information indicating whether the ProSe communication is available in a multi-hop manner, and
wherein the multi-hop communication information indicates whether the first IMS UE is capable of serving as an end node on a multi-hop path and whether the first IMS UE is capable of serving as a relay node on the multi-hop path.

* * * * *